(12) United States Patent
Saito

(10) Patent No.: US 11,046,378 B2
(45) Date of Patent: Jun. 29, 2021

(54) ANALYSIS METHOD AND APPARATUS OF OPTIMIZING JOINT LOCATION OF AUTOMOTIVE BODY

(71) Applicant: JFE STEEL CORPORATION, Tokyo (JP)

(72) Inventor: Takanobu Saito, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 321 days.

(21) Appl. No.: 16/339,088

(22) PCT Filed: Sep. 1, 2017

(86) PCT No.: PCT/JP2017/031655
§ 371 (c)(1),
(2) Date: Apr. 3, 2019

(87) PCT Pub. No.: WO2018/066283
PCT Pub. Date: Apr. 12, 2018

(65) Prior Publication Data
US 2020/0039592 A1    Feb. 6, 2020

(30) Foreign Application Priority Data
Oct. 4, 2016    (JP) .............................. JP2016-196330

(51) Int. Cl.
*B62D 65/00*    (2006.01)
*G06F 30/23*    (2020.01)
(Continued)

(52) U.S. Cl.
CPC ......... *B62D 65/005* (2013.01); *G01M 17/007* (2013.01); *G06F 30/15* (2020.01);
(Continued)

(58) Field of Classification Search
None
See application file for complete search history.

(56) References Cited

U.S. PATENT DOCUMENTS 6,725,168 B2    4/2004    Shiraishi et al.
8,126,684 B2    2/2012    Goel et al.
(Continued)

FOREIGN PATENT DOCUMENTS

JP    2002067636 A    3/2002
JP    2004053313 A    2/2004
(Continued)

OTHER PUBLICATIONS

Nov. 14, 2017, International Search Report issued in the International Patent Application No. PCT/JP2017/031655.
(Continued)

*Primary Examiner* — Craig C Dorais
(74) *Attorney, Agent, or Firm* — Kenja IP Law PC

(57) ABSTRACT

The analysis method of optimizing a joint location of an automotive body of this disclosure is to determine an additional welded point 75 to be added to an automotive body frame model 31, including: an automobile model generation step S3 to generate an automobile model by joining the automotive body frame model 31 to a chassis model 51 via a joining portion; a driving analysis step S5 to perform a driving analysis of the automobile model to acquire a load generated at the joining portion during driving; an optimization analysis model generation step S7 to generate an optimization analysis model 71 by setting welding candidates 73 on the automotive body frame model 31; an optimization analysis condition setting step S9 to set optimization analysis conditions; and an optimization analysis step S11 to apply the load generated at the joining portion to the optimization analysis mode 71 to select an additional (Continued)

welded point 75 that satisfies the optimization analysis conditions from the welding candidates 73.

4 Claims, 19 Drawing Sheets

(51) Int. Cl.
  *G06F 30/15* (2020.01)
  *G01M 17/007* (2006.01)
  *G06F 113/24* (2020.01)
  *G06F 111/10* (2020.01)

(52) U.S. Cl.
  CPC .......... *G06F 30/23* (2020.01); *G06F 2111/10* (2020.01); *G06F 2113/24* (2020.01)

(56) References Cited

U.S. PATENT DOCUMENTS

| | | | | |
|---|---|---|---|---|
| 2011/0172796 | A1* | 7/2011 | Sohmshetty | G05B 19/41865 700/98 |
| 2017/0255718 | A1* | 9/2017 | Yalamanchili | G06F 30/23 |

FOREIGN PATENT DOCUMENTS

| | | |
|---|---|---|
| JP | 2010250818 A | 11/2010 |
| JP | 2014149734 A | 8/2014 |

OTHER PUBLICATIONS

Oct. 21, 2019, the Extended European Search Report issued by the European Patent Office in the corresponding European Patent Application No. 17858122.9.

An Cui et al., The Layout and Fatigue Life Analysis of Welding Spots for the Cab Body in White of a Commercial Vehicle, 2011 International Conference on Electronic & Mechanical Engineering and Information Technology, 2011, pp. 2089-2093, IEEE.

Ann-Britt Ryberg et al., Spot weld reduction methods for automotive structures, Structural and Multidisciplinary Optimization, 2016, pp. 923-934, vol. 53, No. 4.

Christophe Bastien et al., Multidisciplinary Design Optimisation Strategies for Lightweight Vehicle Structures, 10th European LS-DYNA Conference 2015, Würzburg, Germany, Jun. 2015.

Q.I. Bhatti et al., An adaptive optimization procedure for spot-welded structures, Computers and Structures, 2011, pp. 1697-1711, vol. 89, No. 17.

Sep. 9, 2020, Office Action issued by the Korean Intellectual Property Office in the corresponding Korean Patent Application No. 10-2019-7012486 with English language concise statement of relevance.

* cited by examiner

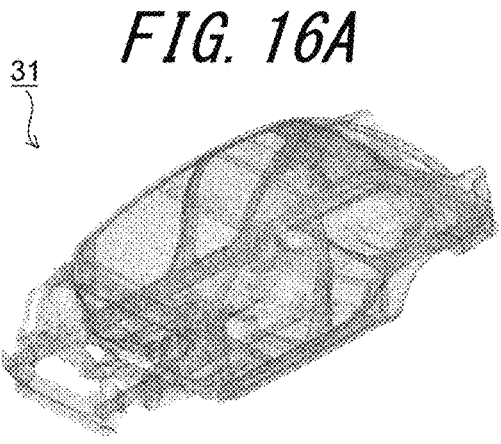
FIG. 16A
Without mass setting
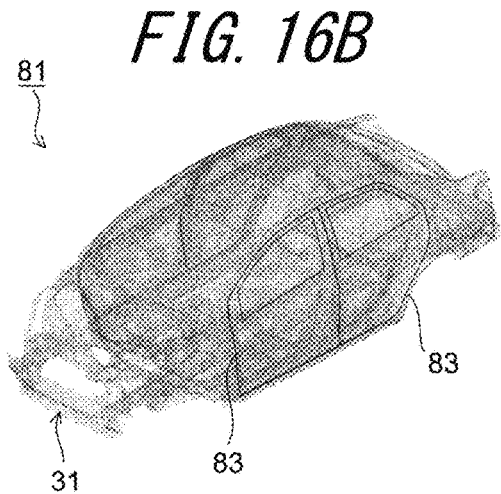
FIG. 16B
With door setting
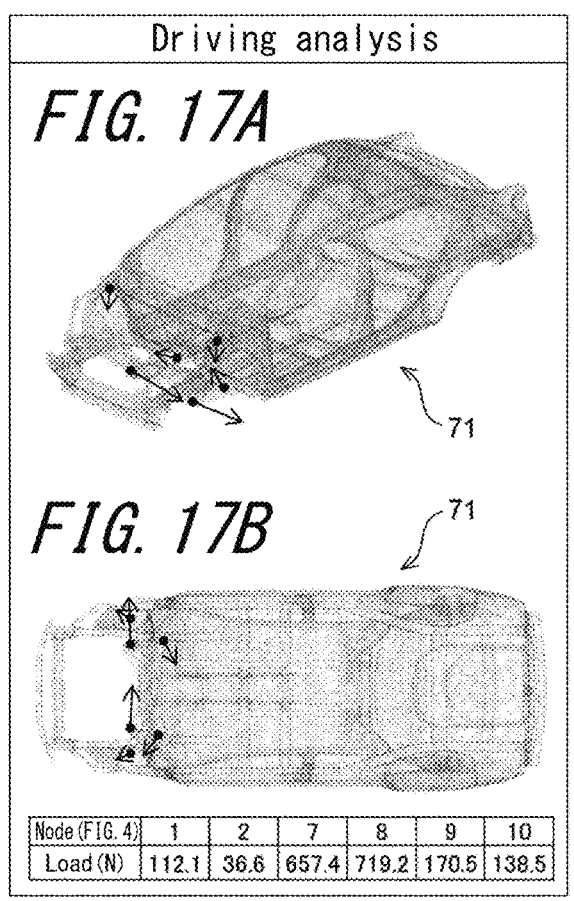
Driving analysis
FIG. 17A
FIG. 17B
| Node (FIG. 4) | 1 | 2 | 7 | 8 | 9 | 10 |
|---|---|---|---|---|---|---|
| Load (N) | 112.1 | 36.6 | 657.4 | 719.2 | 170.5 | 138.5 |
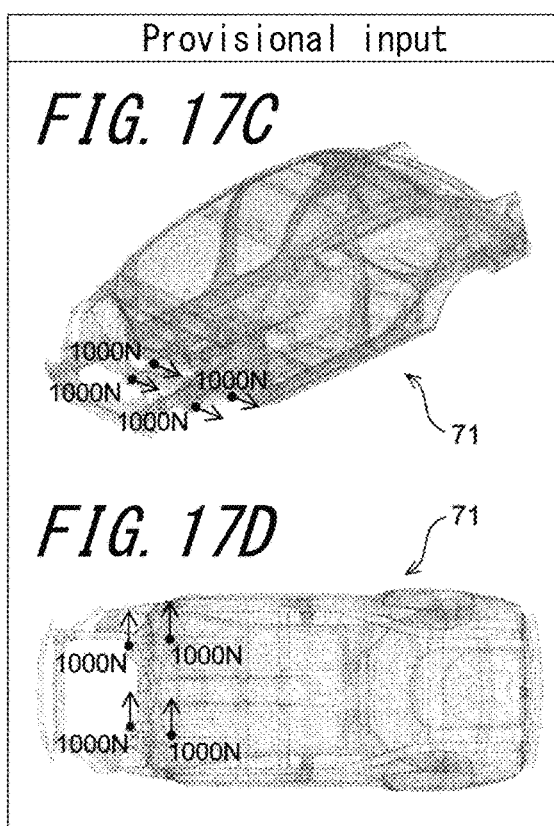
Provisional input
FIG. 17C
FIG. 17D

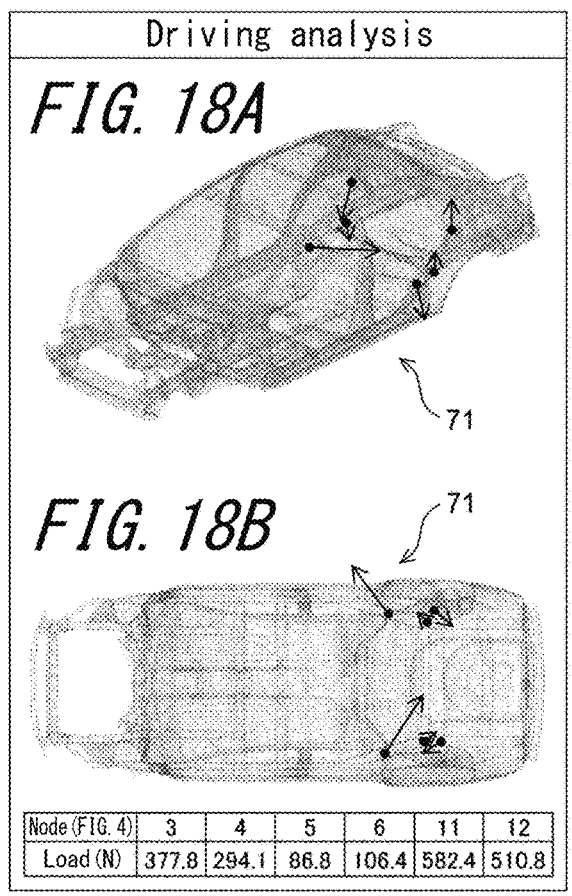
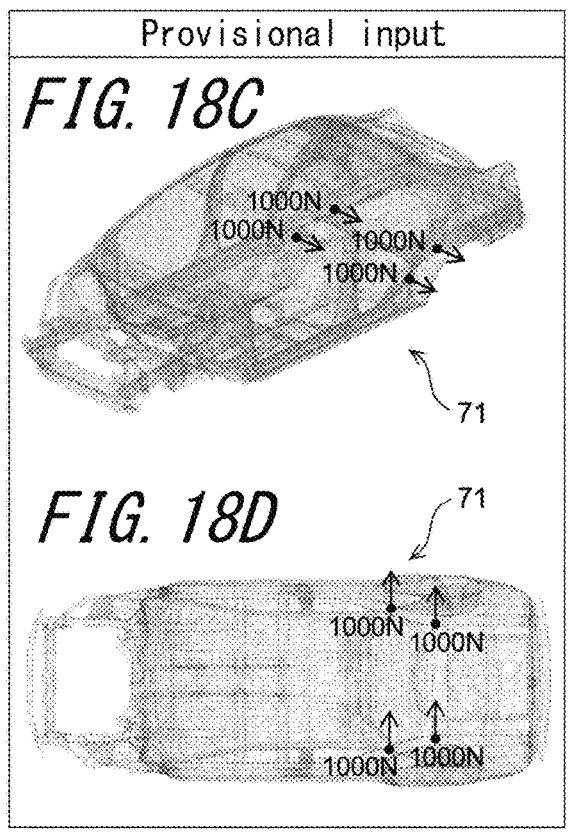

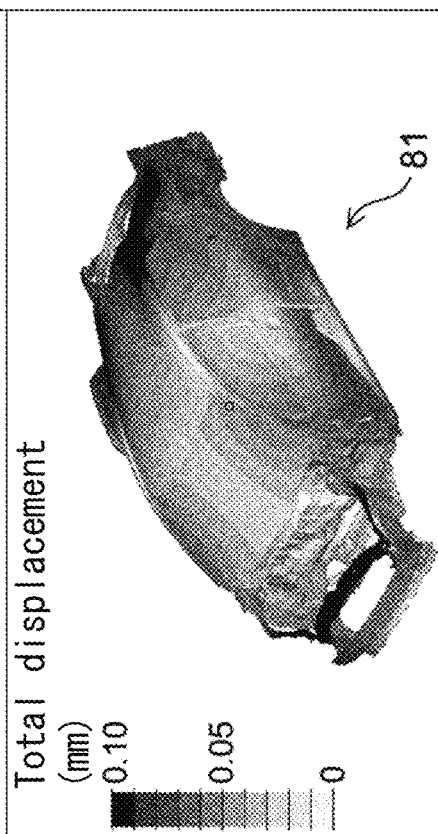
FIG. 19A  With mass setting
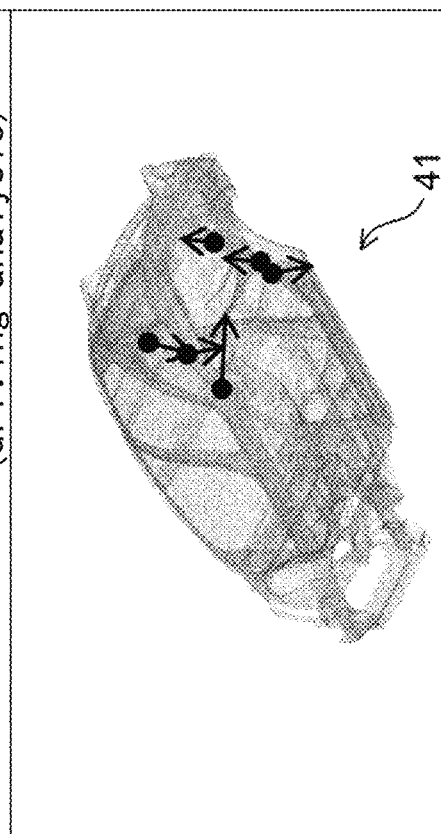
FIG. 19C  With door setting
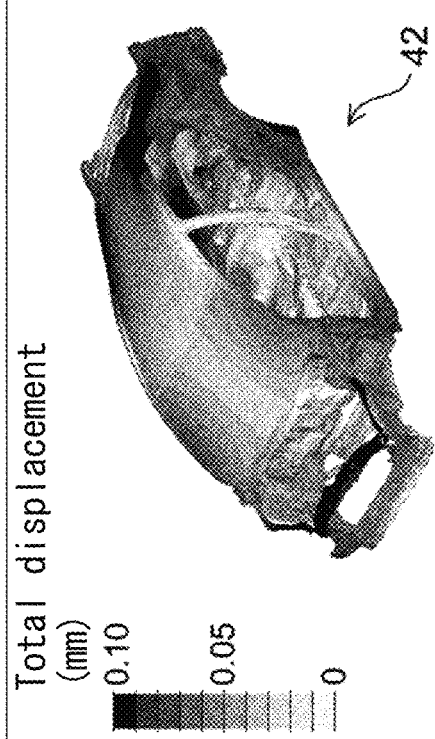
FIG. 19B  Without mass setting
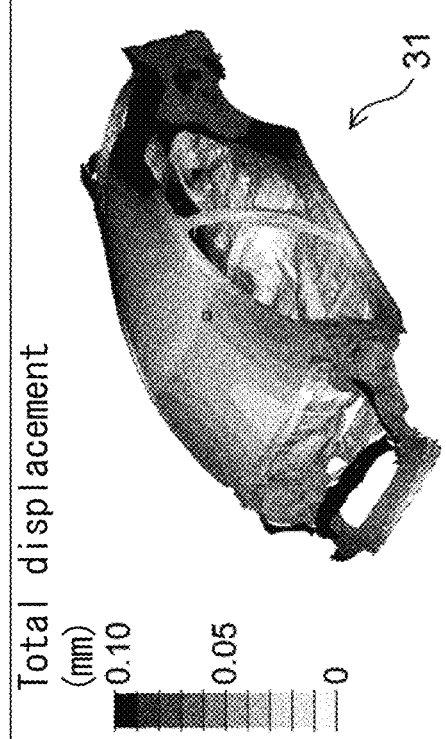
FIG. 19D  Loading condition (driving analysis)

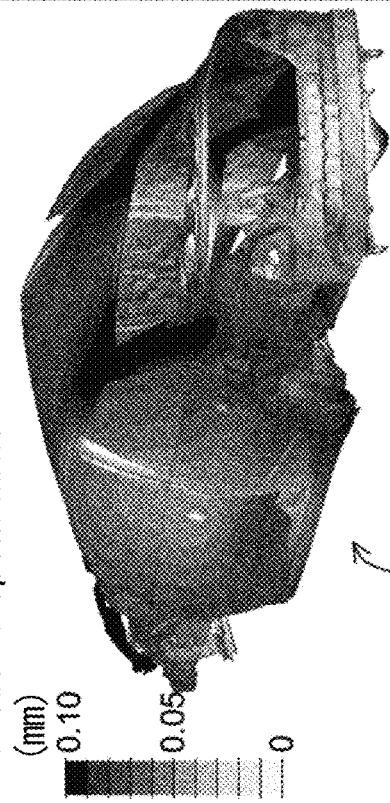
FIG. 20A With mass setting
FIG. 20B Without mass setting
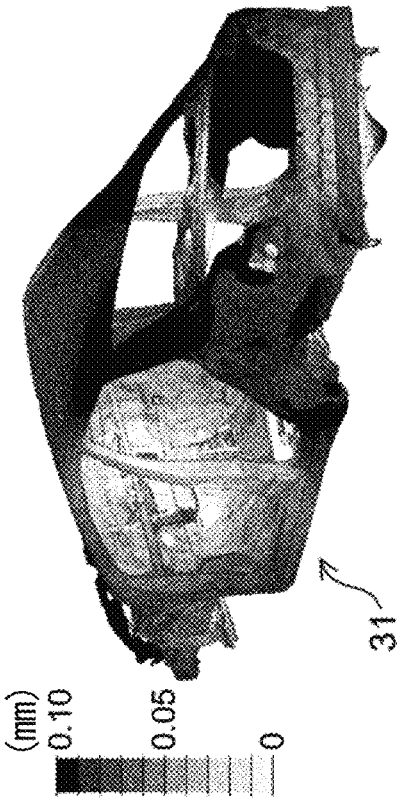
FIG. 20C With door setting
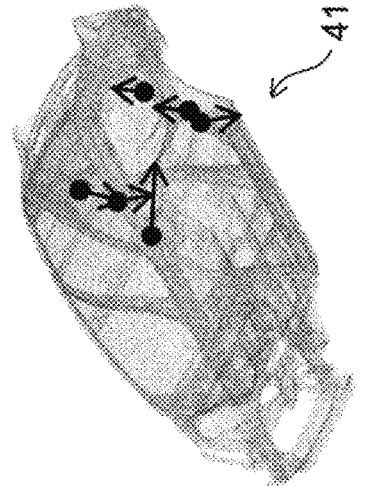
FIG. 20D Loading condition (driving analysis)

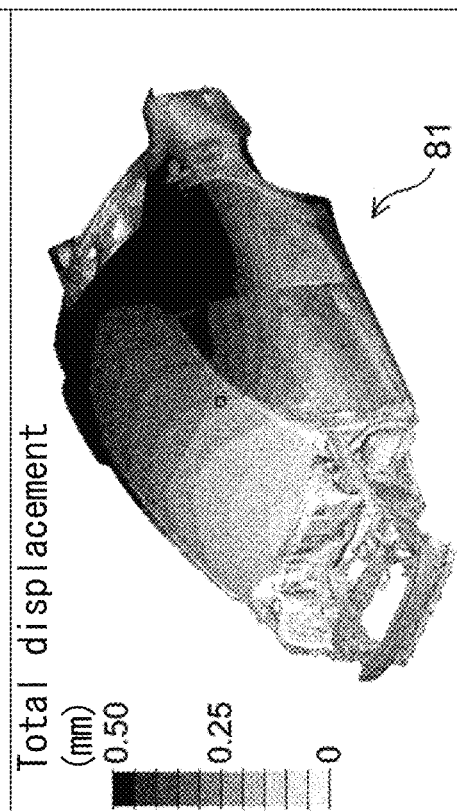
FIG. 21C With door setting
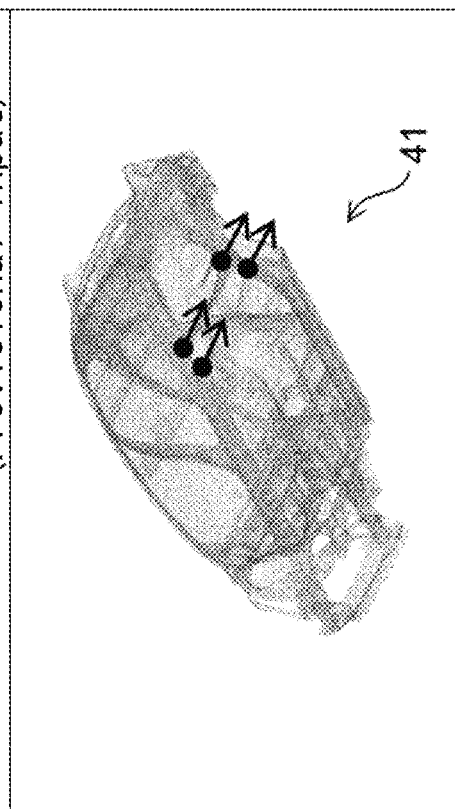
FIG. 21D Loading condition (Provisional input)
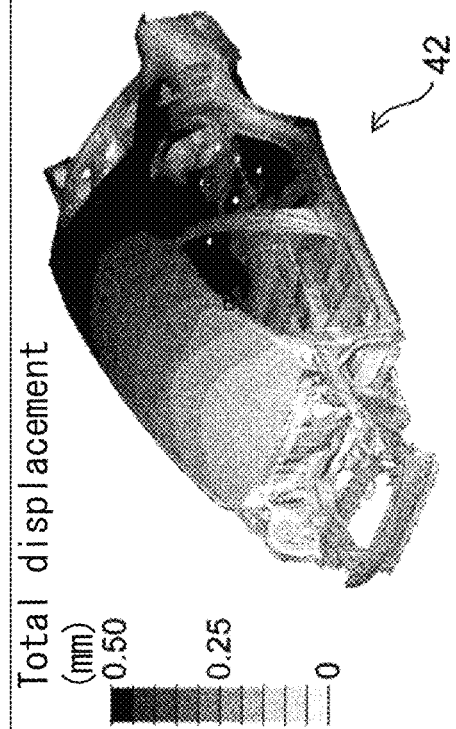
FIG. 21A With mass setting
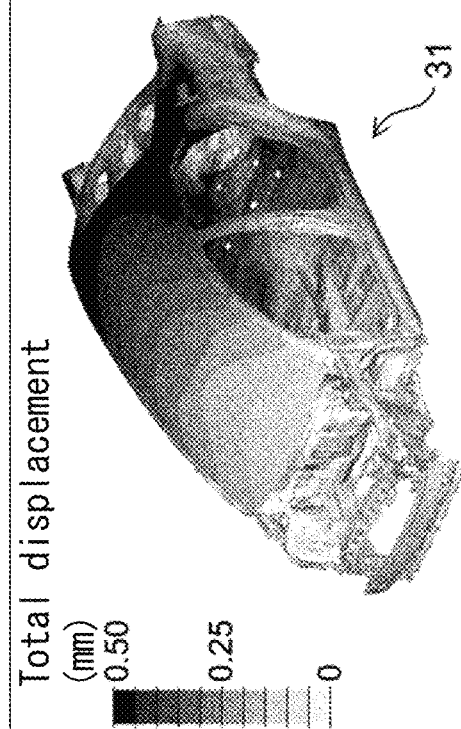
FIG. 21B Without mass setting

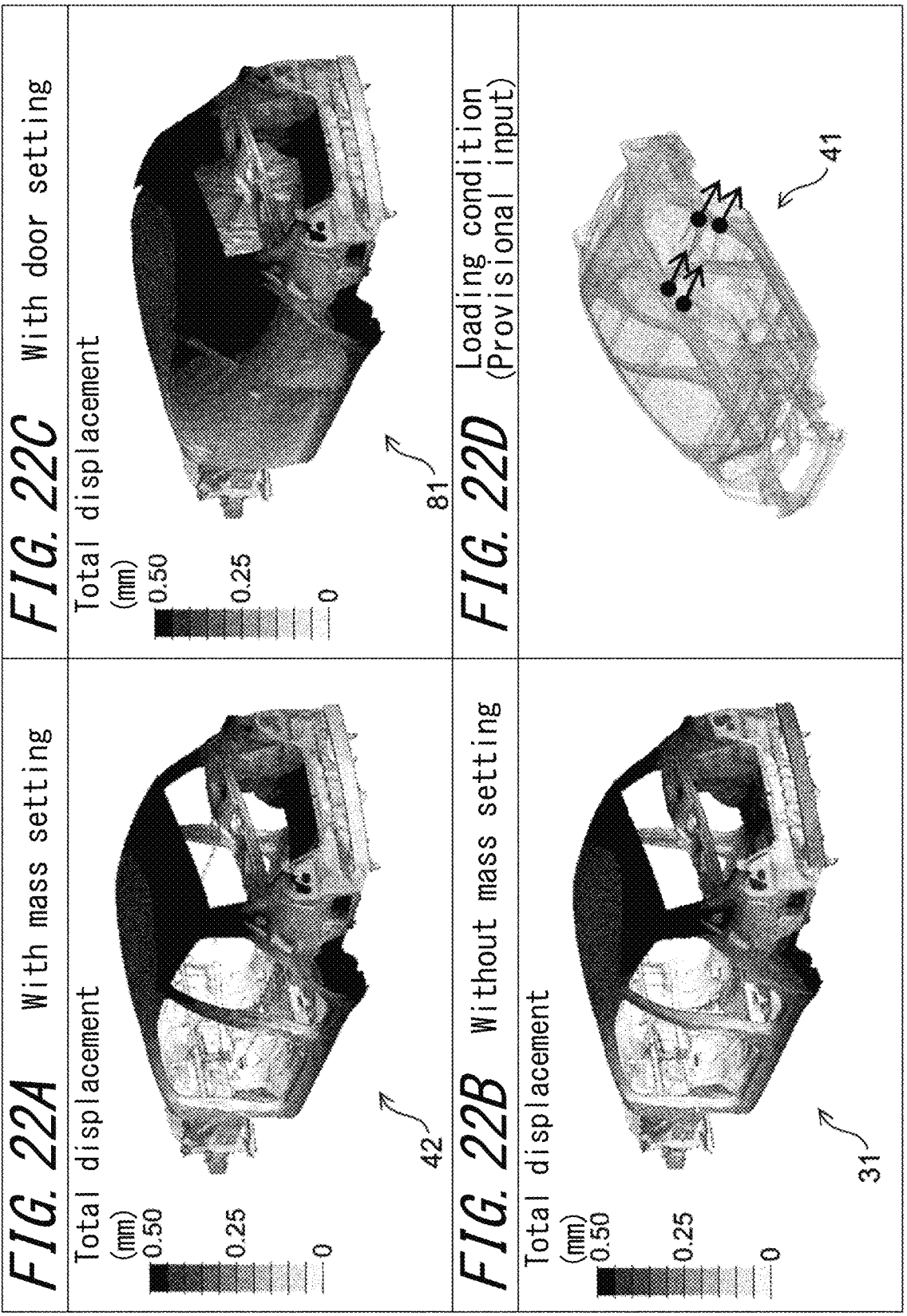

Example 1

Comparative Example 1

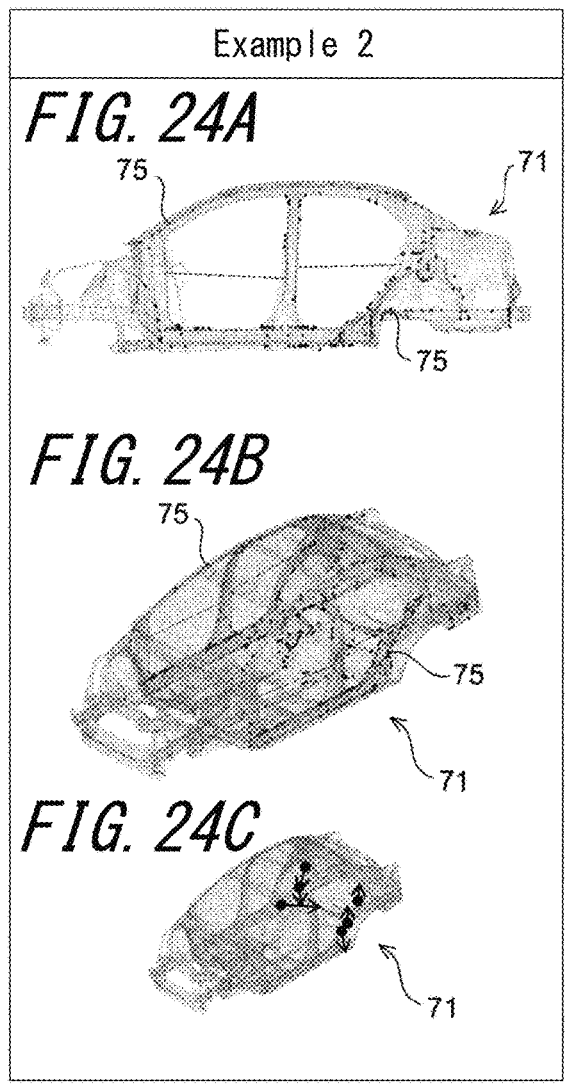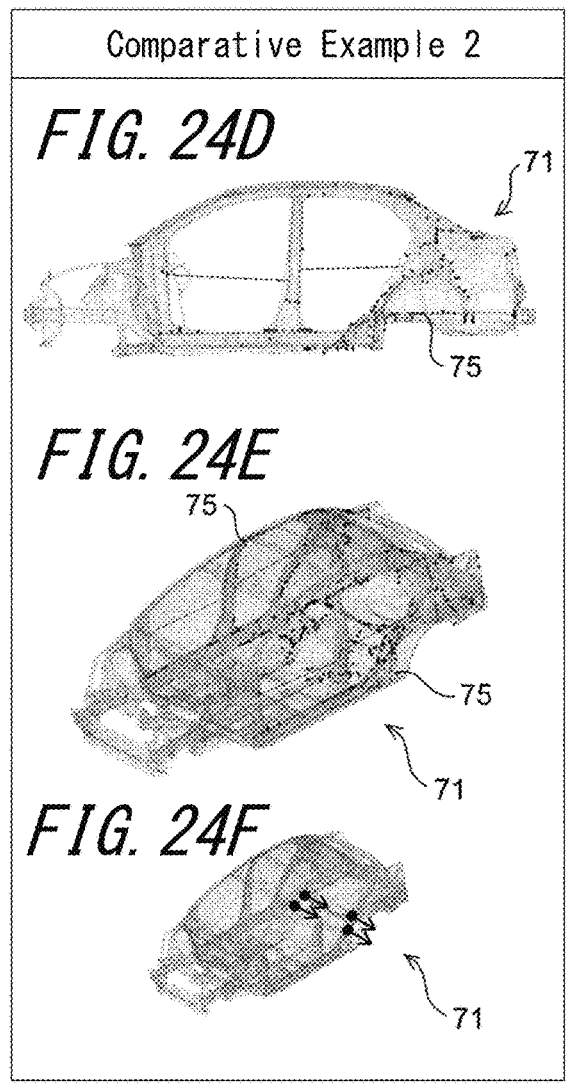

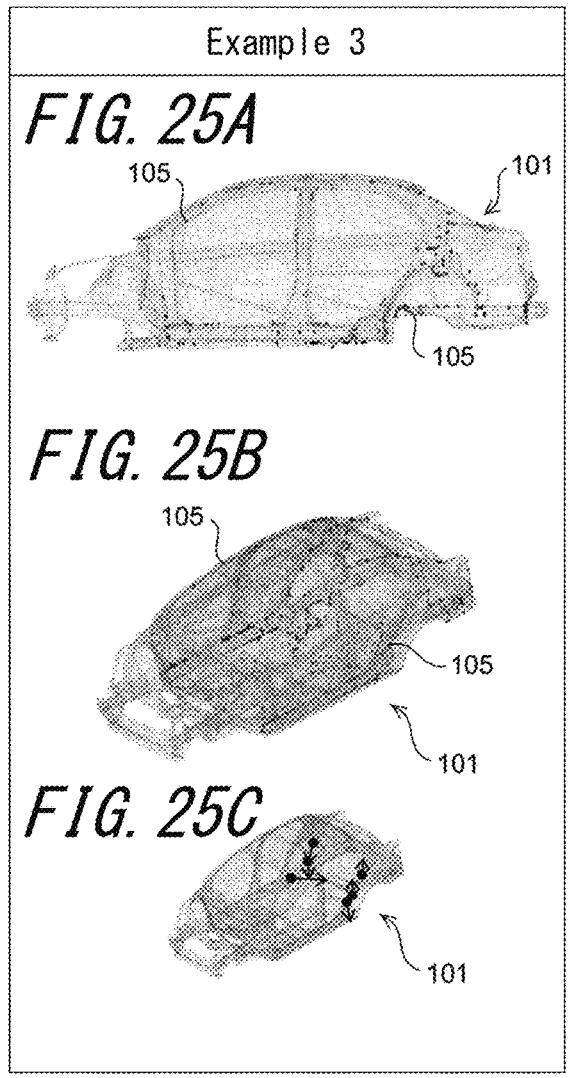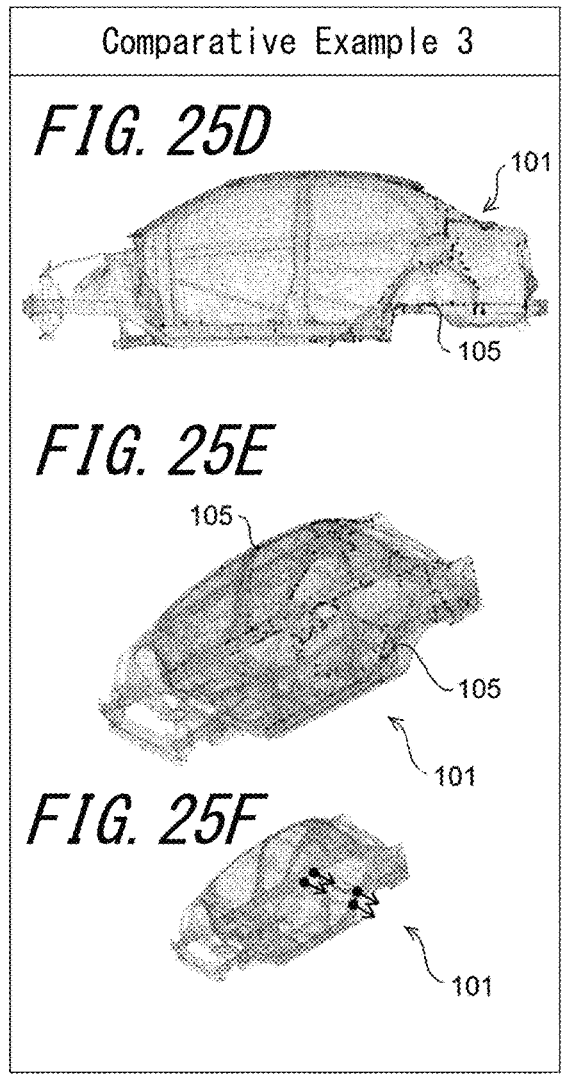

ANALYSIS METHOD AND APPARATUS OF OPTIMIZING JOINT LOCATION OF AUTOMOTIVE BODY

CROSS REFERENCE TO RELATED APPLICATION

The present application claims priority to and the benefit of Japanese Patent Application No. 2016-196330 filed on Oct. 4, 2016, the entire contents of which are incorporated herein by reference.

TECHNICAL FIELD

This disclosure relates to an analysis method and an analysis apparatus of optimizing a joint location of an automotive body of an automobile, and particularly relates to an analysis method and an analysis apparatus of optimizing a joint location of an automotive body that determine an optimal location of a welded point or a welded location to be added to the automotive body in consideration of the driving condition of the automobile.

BACKGROUND

Weight reduction of automotive body in consideration of environmental problems in the automotive industry has progressed in recent years, and computer-aided engineering (hereinafter referred to as 'CAE') analysis has become a technology indispensable to automotive body designing. In the CAE analysis, various analyses such as stiffness analysis, crashworthiness analysis and vibration analysis are performed, which greatly contribute to improvement of performance of automotive body. Furthermore, the CAE analysis not only makes a simple evaluation of the performance of automotive body, but also can support the automotive body designing by using optimization analysis techniques such as mathematical optimization, thickness optimization, shape optimization and topology optimization to realize weight reduction of automotive body and improvement of various kinds of performance such as stiffness and crashworthiness Examples of using optimization analysis techniques to support automotive body designing include a technique of using topology optimization to optimize the components of a complex structural body, which is described in JP 2010-250818 A (PTL 1).

CITATION LIST

Patent Literature

PTL 1: JP 2010-250818 A

SUMMARY

Technical Problem

A structural body such as an automotive body is formed by joining multiple parts together, for example, by welding, and it is known that an increase of the amount of joint location at a joining portion (for example, adding spot welding point) improves the stiffness of the entire structural body. From the cost point of view, however, it is desired to reduce the amount of joint location as much as possible.

Examples of a method of determining a welding location to be added in the joining of parts to improve the stiffness of an automotive body include a method of setting a location, for example, with experience or intuition, and a method of adding a location at a portion defined to receive a large stress through a stress analysis.

However, in the method of setting a location to add welding locations with experience or intuition, the welding location is not set by searching a location necessary for stiffness improvement. As a result, welding is added at an unnecessary location, which is inefficient from the cost point of view.

Additionally, it is true that the method of adding a location at a portion defined to receive a large stress through stress analysis makes some differences as compared to the case before adding, yet only the performance of the vicinities of the portion added as a welding location is improved. The performance of other portions, on the contrary, is relatively lowered. Therefore, the welding location to be added determined by this method is not always an optimal one when the automotive body is evaluated as an entirety.

Furthermore, adding welding locations may make the space between adjacent welding locations too small. In this case, current preferentially flows to a previous welded location (split flow) during the welding, so that the current flowing to the additional welding location is insufficient. This may lead to incomplete welding.

Therefore, in order to improve the performance such as the stiffness of an automotive body, it is conceivable to apply the optimization technique as described in PTL 1. However, the technique does not mention how to apply the optimization technique to the optimization of welding locations forming a structural body such as an automotive body.

The optimization results greatly depend on the boundary condition (loading condition) used in the optimization analysis. In an optimization analysis where the analysis object is simple automotive body behavior such as simple automotive body torsion, it is acceptable to assume the load acting on the automotive body and set the condition. However, in a case of illustrating complex automotive body behavior such as a lane change during the automobile driving, it is difficult to assume the load acting on the automotive body, for example, by desktop calculations and set the condition.

Furthermore, when the automobile is in a driving condition, the inertia force acting on a fitting or lid component placed apart from the center location of the automotive body may have a great influence on the deformation of the automotive body frame. This is because the mass of an assembly of combination of multiple parts, even if it is a fitting or lid component, is 10 kg or more, and it is impossible to ignore its influence on the automotive body frame whose mass is about 100 kg to 300 kg. Therefore, in order to evaluate the performance and to improve the performance of the automotive body frame, it is desirable to take the inertia force acting on the fitting or lid component during actual driving into consideration.

Note that in this disclosure, 'fitting' is a general name for, for example, engine, transmission and seat, and 'lid component' is a general name for, for example, door, trunk and hood.

However, the appearance and design of an automobile generally is not determined at an initial stage of automotive body frame designing, and the lid component or fitting, which is greatly influenced by the appearance and design of the automobile, generally is finally determined at a later stage of the designing.

For this reason, it is difficult to evaluate the performance of the automotive body frame in consideration of the inertia force acting on the fitting or lid component in an actual driving condition before, for example, the shape of the fitting or lid component is determined. Furthermore, even if, for example, the shape of the fitting or lid component is determined at a later stage of the designing, there is no spare time during the development of new car to perform a CAE analysis on the automobile (full body) on which the fitting or lid component has been placed, evaluate the performance of the automotive body frame, and go back to correct the design of the automotive body frame or to add joint locations. Therefore, there has been no choice but to perform performance evaluation and designing of an automotive body frame by the CAE analysis targeted only at an automotive body frame.

It could thus be helpful to provide, for an automotive body frame model of an automobile obtained by joining multiple parts as assemblies of parts, an analysis method and an analysis apparatus of optimizing a joint location of an automotive body with which an optimal location of an additional welded point or an additional welded location to be added to a portion to join the part as an assembly of parts can be determined in consideration of the load acting on the automotive body during the automobile driving. Furthermore, it could be helpful to provide an analysis method and an analysis apparatus of optimizing a joint location of an automotive body with which an optimal location of an additional welded point or an additional welded location to be added to a portion to join the part as an assembly of parts can be determine in consideration of the inertia force acting on a fitting or lid component of the automobile during driving, even before the fitting or lid component is determined.

Solution to Problem (1) The analysis method of optimizing a joint location of an automotive body of this disclosure uses an automotive body frame model, which has multiple parts formed by at least one of a shell element or a solid element and has a welded point or a welded location to join the multiple parts as assemblies of parts, and performs an optimization analysis of spot welding or continuous welding used for joining the assemblies of parts by a computer in the following steps, including: an automobile model generation step where the computer generates an automobile model by joining the automotive body frame model to a chassis model; a driving analysis step where the computer performs a driving analysis of the automobile model to acquire at least one of a load or displacement generated at a joining portion to the chassis model on the automotive body frame model during driving; an optimization analysis model generation step where the computer sets welding candidates of an additional welded point or an additional welded location to be added and joined to the assembly of parts on the automotive body frame model, to generate an optimization analysis model as an optimization analysis object; an optimization analysis condition setting step where the computer sets optimization analysis conditions for the optimization analysis model based on an instruction from an operator; and an optimization analysis step where the computer performs an optimization analysis by applying at least one of the load or the displacement generated at the joining portion acquired in the driving analysis step to the optimization analysis model, to select an additional welded point or an additional welded location that satisfies the optimization analysis conditions from the welding candidates, where in the optimization analysis model generation step, the welding candidates are set at a predetermined interval between welded points or welded locations preset on each assembly of parts of the automotive body frame model.

(2) The method of (1), including a mass-set automotive body frame model generation step where a mass corresponding to the mass of a fitting or lid component is set at a predetermined location within an area where the fitting or lid component is to be fixed or coupled to the automotive body frame model.

(3) The analysis apparatus of optimizing a joint location of an automotive body of this disclosure uses an automotive body frame model, which has multiple parts formed by at least one of a shell element or a solid element and has a welded point or a welded location to join the multiple parts as assemblies of parts, to perform an optimization analysis of spot welding or continuous welding used for joining the assemblies of parts, including: an automobile model generation unit that generates an automobile model by joining the automotive body frame model to a chassis model; a driving analysis unit that performs a driving analysis of the automobile model to acquire at least one of a load or displacement generated at a joining portion to the chassis model on the automotive body frame model during driving; an optimization analysis model generation unit that sets welding candidates of an additional welded point or an additional welded location to be added and joined to the assembly of parts on the automotive body frame model, to generate an optimization analysis model as an optimization analysis object; an optimization analysis condition setting unit that sets optimization analysis conditions for the optimization analysis model; and an optimization analysis unit that performs an optimization analysis by applying at least one of the load or the displacement generated at the joining portion acquired by the driving analysis unit to the optimization analysis model, to select an additional welded point or an additional welded location that satisfies the optimization analysis conditions from the welding candidates, where the optimization analysis model generation unit sets the welding candidates at a predetermined interval between welded points or welded locations preset on each assembly of parts of the automotive body frame model.

(4) The apparatus of (3), including a mass-set automotive body frame model generation unit that sets a mass corresponding to the mass of a fitting or lid component at a predetermined location within an area where the fitting or lid component is to be fixed or coupled to the automotive body frame model.

Advantageous Effect (1) This disclosure uses an automotive body frame model, which has multiple parts formed by at least one of a shell element or a solid element and has a welded point or a welded location to join the multiple parts as assemblies of parts, and performs an optimization analysis of spot welding or continuous welding used for joining the assemblies of parts by a computer in the following steps, including: an automobile model generation step where the computer generates an automobile model by joining the automotive body frame model to a chassis model; a driving analysis step where the computer performs a driving analysis of the automobile model to acquire at least one of a load or displacement generated at a joining portion to the chassis model on the automotive body frame model during driving; an optimization analysis model generation step where the computer sets welding candidates of an additional welded point or an additional welded location to be added and joined to the assembly of parts on the automotive body frame model, to generate an optimization analysis model as an optimization analysis object; an optimization analysis condition setting step where the computer sets optimization analysis conditions for the optimization analysis model based on an instruction from an operator; and an optimization analysis step where the computer performs an optimization analysis by applying at least one of the load or the displacement generated at the joining portion acquired in the driving analysis step to the optimization analysis model, to select an additional welded point or an additional welded location that satisfies the optimization analysis conditions from the welding candidates, where in the optimization analysis model generation step, the welding candidates are set at a predetermined interval between welded points or welded locations preset on each assembly of parts of the automotive body frame model. In this way, it is possible to perform an optimization analysis by applying the load and displacement acting on the automotive body frame model during the automobile driving, and to determine an optimal location of an additional welded point or an additional welded location to be added to the assembly of parts to improve the stiffness of the automobile with high accuracy.

(2) Furthermore, it is possible to perform an optimization analysis in consideration of the inertia force acting on a fitting or lid component during driving even before the fitting or lid component is determined to determine an additional welded point or an additional welded location to be added to the automotive body frame model with higher accuracy, by including a mass-set automotive body frame model generation step where a mass corresponding to the mass of the fitting or lid component is set at a predetermined location within an area where the fitting or lid component is to be fixed or coupled to the fixed coupling portion of the automotive body frame model.

BRIEF DESCRIPTION OF THE DRAWINGS

In the accompanying drawings:

FIG. 2A is a perspective view and FIG. 2B is a side view;

FIG. 5A is a perspective view and FIG. 5B is a side view;

FIG. 7A is a perspective view and FIG. 7B is a side view;

FIG. 12A illustrates the steering angle and FIG. 12B illustrates the running path;

FIG. 13A illustrates the welded points, FIG. 13B illustrates the generation of welding candidates, and FIG. 13C illustrates the selection of an additional welded point;

FIG. 14A illustrates the steering angle, FIG. 14B illustrates the running path, FIG. 14C illustrates the location of the welded location, FIG. 14D illustrates the change with time of the load generated at the welded location, and FIG. 14E illustrates the magnitude and direction of the load generated at the welded location;

FIG. 15A illustrates the steering angle, FIG. 15B illustrates the running path, FIG. 15C illustrates the location of the welded location, FIG. 15D illustrates the change with time of the load generated at the welded location, and FIG. 15E illustrates the magnitude and direction of the load generated at the welded location;

FIGS. 16A and 16B illustrate an automotive body frame model to be analyzed in EXAMPLES;

FIGS. 17A to 17D illustrate the loading condition applied to an optimization analysis model in EXAMPLES (front side);

FIGS. 18A to 18D illustrate the loading condition applied to an optimization analysis model in EXAMPLES (rear side);

FIGS. 19A to 19D illustrate the analysis results of deformation of automotive body when applying the loading condition acquired by a driving analysis in a stiffness analysis of an automotive body in EXAMPLES (part 1);

FIGS. 20A to 20D illustrate the analysis results of deformation of automotive body when applying the loading condition acquired by a driving analysis in a stiffness analysis of an automotive body in EXAMPLES (part 2);

FIGS. 21A to 21D illustrate the analysis results of deformation of automotive body when applying a provisional loading condition in a stiffness analysis of an automotive body in EXAMPLES (part 1);

FIGS. 22A to 22D illustrate the analysis results of deformation of automotive body when applying a provisional loading condition in a stiffness analysis of an automotive body in EXAMPLES (part 2)

FIGS. 24A to 24F illustrate the analysis results of the additional welded point selected by an optimization analysis on an optimization analysis model generated by using an automotive body frame model without mass setting in EXAMPLES;

FIGS. 25A to 25F illustrate the analysis results of the additional welded point selected by an optimization analysis on an optimization analysis model generated by using an automotive body frame model on which a revolving door assembly model has been set in EXAMPLES.

DETAILED DESCRIPTION

An analysis method and an analysis apparatus of optimizing a joint location of an automotive body of an embodiment of this disclosure will be described below with reference to FIGS. 1 to 13C. Before describing the analysis method and the analysis apparatus of optimizing a joint location of an automotive body, an automotive body frame model of this disclosure will be described first.

<Automotive Body Frame Model>

An automotive body frame model used in this disclosure is composed of multiple parts including a chassis part. Each part of the automotive body frame model is modeled by a shell element and/or a solid element. The automotive body frame model has a welded point or a welded location provided at a portion to join each part as an assembly of parts, a fixed coupling portion to fix or couple a fitting or lid component, and a welded location to join an automotive body model having a suspension system and a steering system.

FIGS. 2A to 4 illustrate an example of the automotive body frame model 31.

Figure 2A:
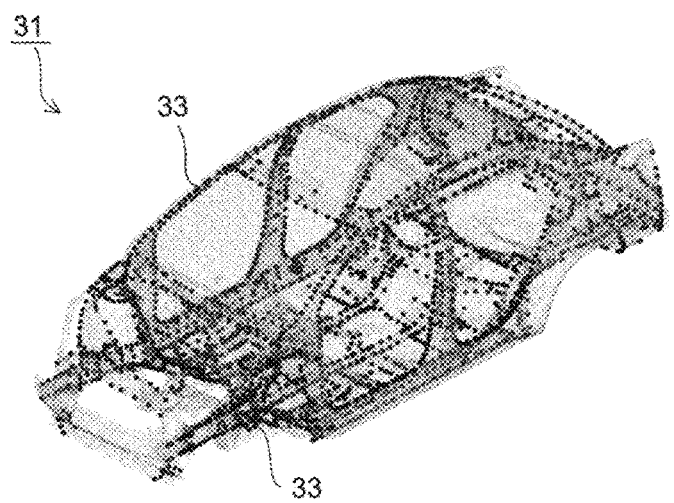
FIGS. 2A and 2B illustrate an automotive body frame model used in the present embodiment and welded points preset on the automotive body frame model, where
Figure 2B:
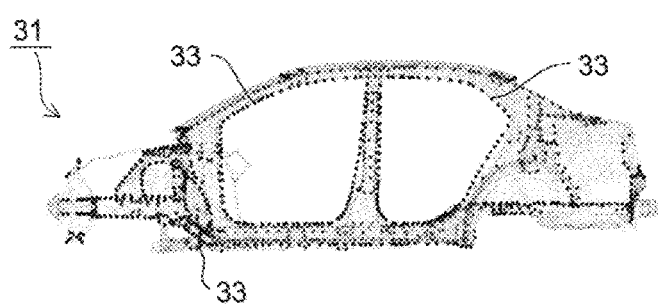

As illustrated in FIGS. 2A and 2B, in the automotive body frame model 31, the parts are joined by spot welding, and welded points 33 are preset at a portion to be joined on each assembly of parts.

Figure 3:
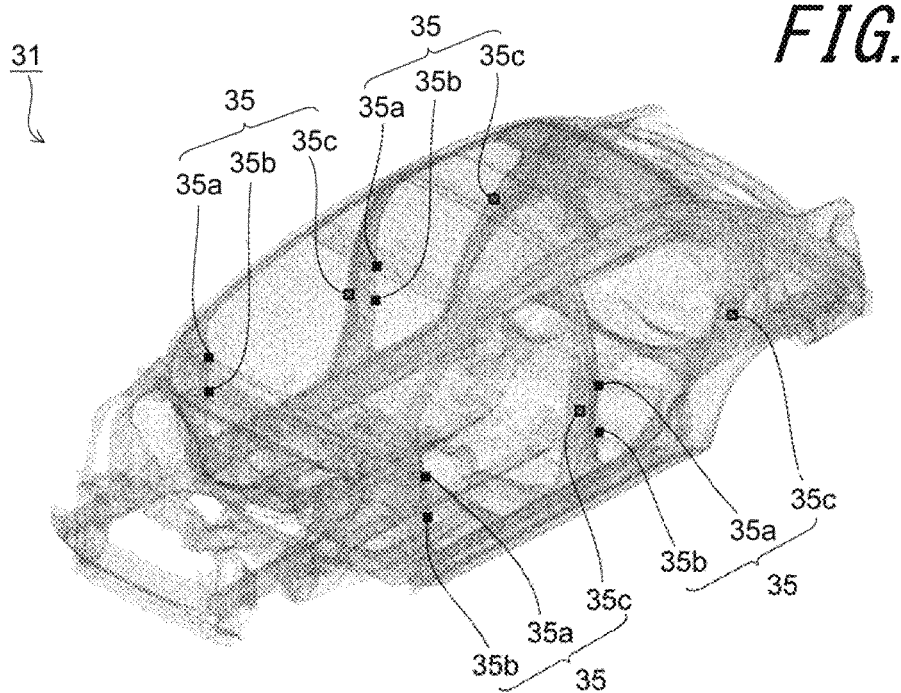
FIG. 3 illustrates the automotive body frame model used in the present embodiment and fixed coupling portions set on the automotive body frame model.

Additionally, as illustrated in FIG. 3, a hinge 35a, a hinge 35b and a door striker 35c, which are the fixed coupling portions 35 to fix or couple a revolving door as a lid component, are set on the automotive body frame model 31.

The fixed coupling portion of the automotive body frame model of this disclosure is not limited thereto and may be, for example, a portion to fix a fitting such as an engine mount that fixes an engine, or a portion to fix or couple a lid component other than a revolving door such as a slide door or a bonnet.

Figure 4:
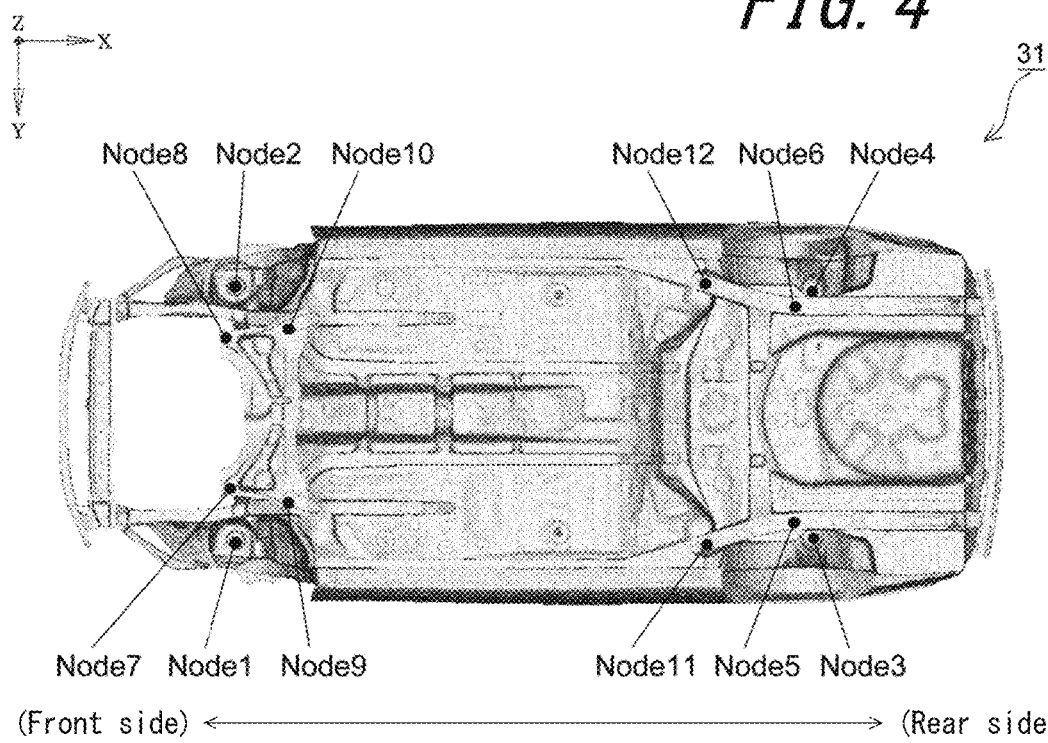
FIG. 4 illustrates the location of joining portions to join a chassis model on the automotive body frame model used in the present embodiment.

Furthermore, as illustrated in FIG. 4, joining portions (Nodes 1 to 12) to join a chassis model 51 (see FIGS. 5A and 5B) having a suspension system including, for example, a tire, a suspension arm, a suspension spring and a shock absorber, and a steering system including, for example, a steering handle are preset on the automotive body frame model 31. In FIG. 4, six joining portions (Nodes 1, 2, 7, 8, 9 and 10) are set on the front side, and six joining portions (Nodes 3, 4, 5, 6, 11 and 12) are set on the rear side.

The automotive body frame model 31 is modeled into an elastic body, a viscoelastic body, or an elasto-plastic body in order to analyze, for example, the deformation behavior under the influence of load or inertia force.

Furthermore, in the chassis model 51 to be joined to the automotive body frame model 31, a part such as a suspension arm is modeled into a rigid body, an elastic body or an elasto-plastic body, and a tire or a suspension spring is modeled into an elastic body, a viscoelastic body, or an elasto-plastic body.

Figure 1:
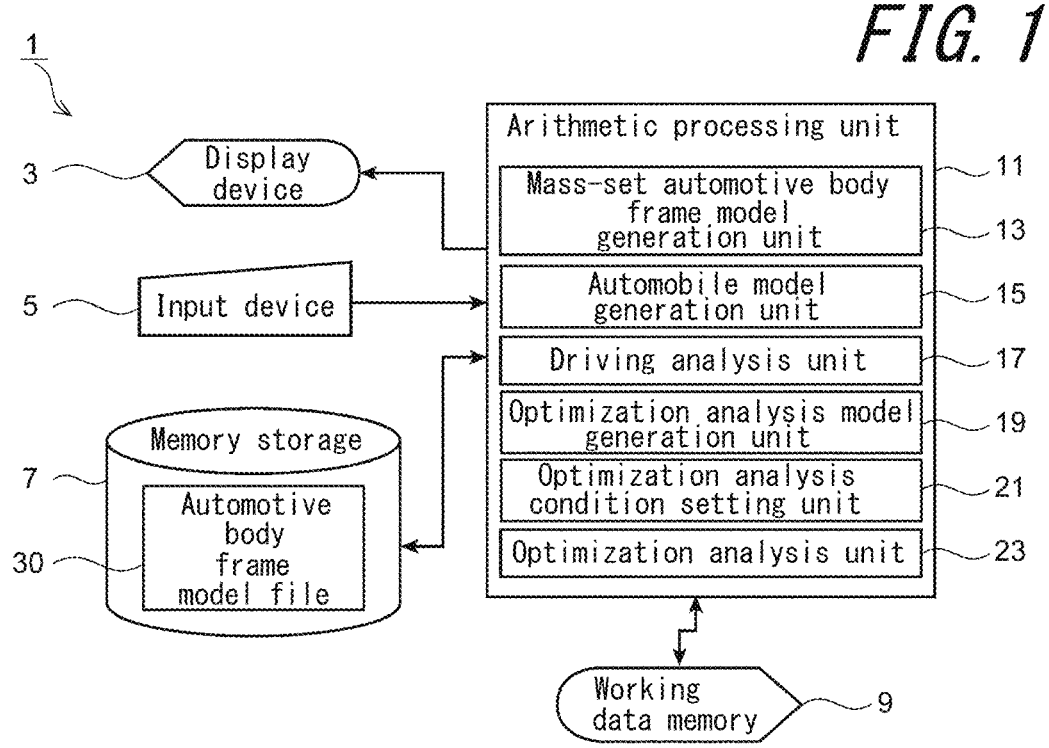
FIG. 1 is a block diagram of an analysis apparatus of optimizing a joint location of an automotive body of an embodiment of this disclosure.

The element information of each part composing the automotive body frame model 31, the information of the welded point 33 on each assembly of parts (FIGS. 2A and 2B), of the fixed coupling portion 35 to fix or couple the fitting or lid component (FIG. 3) and of the joining portion to join the suspension system (FIG. 4), and other information is stored in an automotive body frame model file 30 (see FIG. 1).

<Optimization Analysis Apparatus>

The configuration of an analysis apparatus 1 of optimizing a joint location of an automotive body (hereinafter simply referred to as 'optimization analysis apparatus 1') of the present embodiment will be described below mainly based on the block diagram as illustrated in FIG. 1.

The optimization analysis apparatus 1 of the present embodiment is an apparatus of optimizing an additional welded point or an additional welded location to be added to a portion to join the multiple parts composing the automotive body frame model 31 (see FIGS. 2A to 4) as assemblies of parts. The optimization analysis apparatus 1 is constituted, for example, by a personal computer, and includes a display device 3, an input device 5, a memory storage 7, a working data memory 9 and an arithmetic processing unit 11.

The display device 3, input device 5, memory storage 7 and working data memory 9 are connected to the arithmetic processing unit 11 and execute their respective functions according to a command from the arithmetic processing unit 11.

<<Display Device>>

The display device 3 is used for displaying, for example, analysis results, and is constituted, for example, by a LCD monitor.

<<Input Device>>

The input device 5 is used, for example, for instructing display of the automotive body frame model file 30 and inputting conditions set by an operator, and is constituted, for example, by a keyboard and a mouse.

<<Memory Storage>>

The memory storage 7 is used, for example, for storing various files such as the automotive body frame model file 30, and is constituted, for example, by a hard disk.

<<Working Data Memory>>

The working data memory 9 is used for temporary storing and computing data to be used in the arithmetic processing unit 11, and is constituted, for example, by a random access memory (RAM).

<<Arithmetic Processing Unit>>

As illustrated in FIG. 1, the arithmetic processing unit 11 includes a mass-set automotive body frame model generation unit 13, an automobile model generation unit 15, a driving analysis unit 17, an optimization analysis model generation unit 19, an optimization analysis condition setting unit 21 and an optimization analysis unit 23, and is constituted by a central processing unit (CPU) of, for example, a personal computer. These units function when the CPU executes a predetermined program.

The function of each unit of the arithmetic processing unit 11 will be described below. The specific processes of the function of each unit of the arithmetic processing unit 11 will be described later in <Analysis Method of Optimizing Joint Location>.

(Mass-Set Automotive Body Frame Model Generation Unit)

Figure 6:
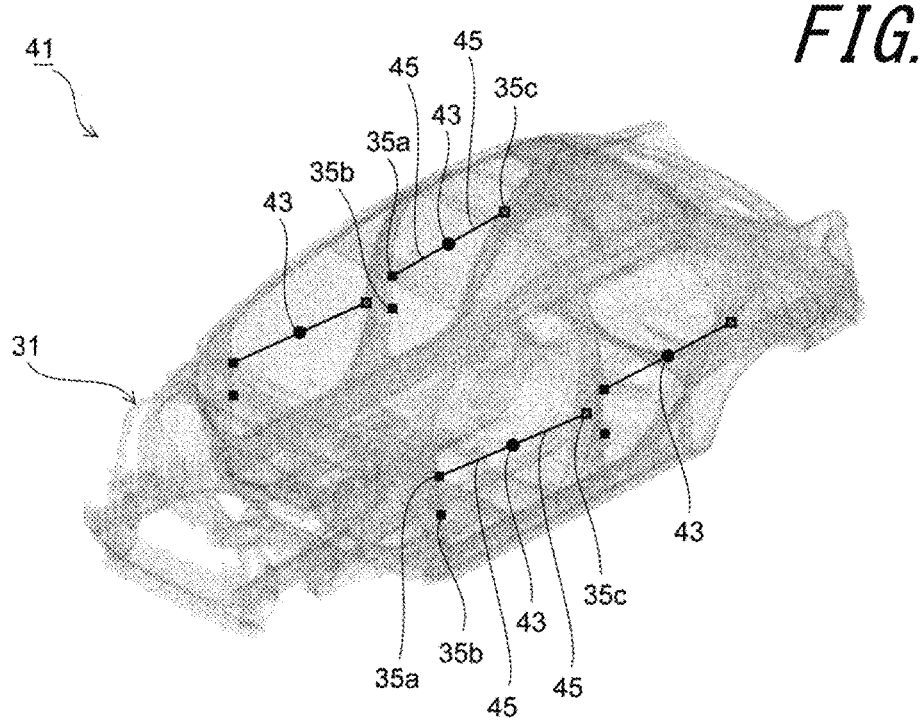
FIG. 6 illustrates an example of a mass-set automotive body frame model obtained by setting a mass element on the automotive body frame model used in the present embodiment.

The mass-set automotive body frame model generation unit 13 sets a mass corresponding to the mass of a fitting or lid component at a predetermined location within an area where the fitting or lid component is to be fixed or coupled to a fixed coupling portion 35 of an automotive body frame model 31 as illustrated in FIG. 3, to generate a mass-set automotive body frame model 41 as illustrated in FIG. 6.

(Automobile Model Generation Unit)

Figure 5A:
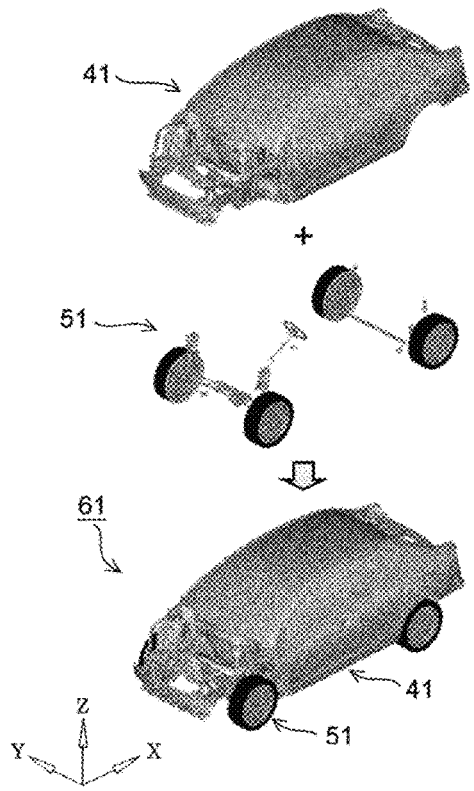
FIGS. 5A and 5B illustrate the generation of an automobile model used in a driving analysis of the present embodiment, where
Figure 5B:
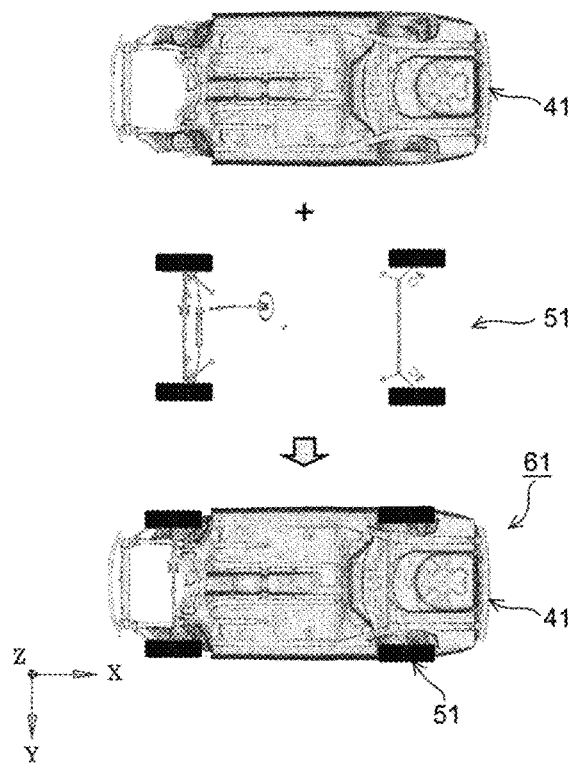

The automobile model generation unit 15 joins the mass-set automotive body frame model 41, which is obtained by the mass-set automotive body frame model generation unit 13 setting the mass on the automotive body frame model 31, to a chassis model 51 having, for example, a suspension system and a steering system via the joining portions (Nodes 1 to 12 in FIG. 4) of the automotive body frame model 31, to generate an automobile model 61, as illustrated in FIGS. 5A and 5B.

(Driving Analysis Unit)

The driving analysis unit 17 performs a driving analysis which takes the automobile model 61 generated by the automobile model generation unit 15 as the analysis object, to acquire the performance of automotive body during driving.

In the driving analysis of the automobile model 61, it is necessary to set driving conditions such as driving and steering of the automobile model 61. Examples of the driving conditions to be set include a load applied to the automobile model 61 to drive the automobile model 61, and a steering angle set on the steering handle of the chassis model 51 to steer the automobile model 61.

Additionally, the driving analysis unit 17 acquires, for example, the load and displacement generated at the joining portion to the chassis model 51 on the automotive body frame model 31, when the automobile model 61 is driving under the set driving conditions.

Furthermore, the driving analysis unit 17 can also acquire the stress and deformation on the mass-set automotive body frame model 41 as the performance of automotive body of the driving automobile model 61.

The driving analysis unit 17 of the present embodiment may be commercially available automobile driving analysis software. In this case, the automobile model generation unit 15 may generate an automobile model using a chassis model obtained by combining components such as a suspension provided in the driving analysis software.

(Optimization Analysis Model Generation Unit)

The optimization analysis model generation unit 19 generates welding candidates of an additional welded point or an additional welded location to be added to the portion to join the part of the mass-set automotive body frame model 41 generated by the mass-set automotive body frame model generating unit 13 as an assembly of parts, to generate an optimization analysis model as the analysis object of the optimization analysis.

Figure 7A:
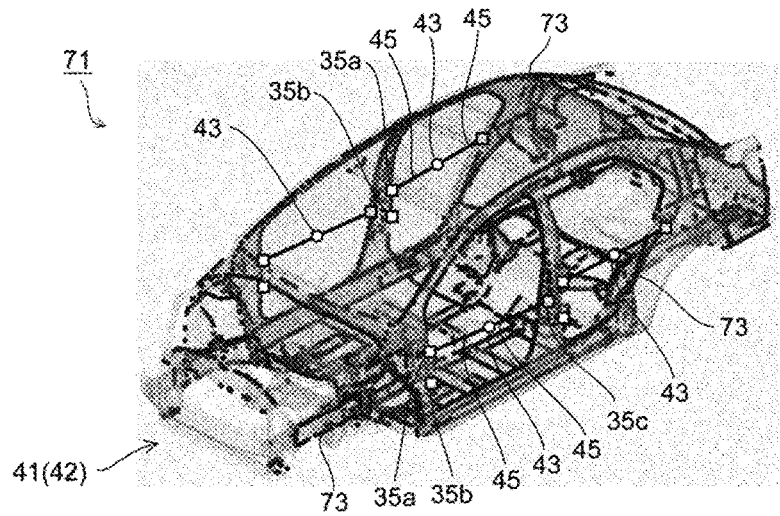
FIGS. 7A and 7B illustrate an example of an optimization analysis model generated by setting welding candidates on the mass-set automotive body frame model on which the mass element has been set in an optimization analysis of the present embodiment, where
Figure 7B:
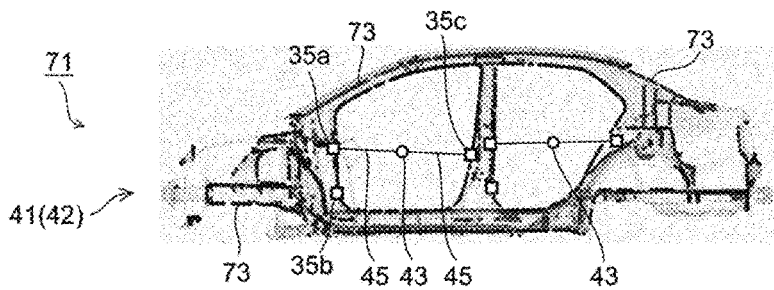

FIGS. 7A and 7B illustrate an example in which welding candidates 73 are generated on the mass-set automotive body frame model 41 to generate an optimization analysis model 71. The welding candidates 73 are closely generated at a predetermined interval (an interval of 10 mm) between the welded points 33 (FIGS. 2A and 2B) preset on each assembly of parts of the mass-set automotive body frame model 41. Note that the welded point 33 (see FIGS. 2A and 2B) preset on the mass-set automotive body frame model 41 is not illustrated in FIGS. 7A and 7B.

(Optimization Analysis Condition Setting Unit)

The optimization analysis condition setting unit 21 sets optimization analysis conditions for the welding candidates 73. The optimization analysis conditions include two kinds of conditions: objective condition and constraint condition.

The objective condition is a condition set according to the object of the optimization analysis on the optimization analysis model 71, and examples thereof include minimizing strain energy, and maximizing absorbed energy to minimize generated stress.

The constraint condition is a constraint imposed on the optimization analysis, and examples thereof include making the optimization analysis model 71 generated from the mass-set automotive body frame model 41 have a predetermined stiffness. It is possible to set multiple constraint conditions.

(Optimization Analysis Unit)

The optimization analysis unit 23 applies the load generated at the joining portions (Nodes 1 to 12 in FIG. 4) of the mass-set automotive body frame model 41 acquired by the driving analysis unit 17 as a loading and constraint condition to the optimization analysis model 71 to perform an optimization analysis which takes the welding candidates 73 as the analysis object, to select a significant welding candidate 73 that satisfies the optimization analysis conditions (objective condition and constraint condition) set by the optimization analysis condition setting unit 21.

The optimization analysis unit 23 of the present embodiment may perform the optimization analysis in consideration of the inertia force acting on a mass element 43 during the automobile driving with an inertia relief method.

The optimization analysis by the optimization analysis unit 23 may apply, for example, topology optimization.

When using a density method during the topology optimization, discretization is preferable if the number of intermediate density is large, as indicated in equation (1).

$$\underline{K}(\rho) = \rho^p K$$

where
$\underline{K}$ is stiffness matrix obtained by imposing penalty on element stiffness matrix,
K is element stiffness matrix,
$\rho$ is normalized density, and
p is a penalty factor.

The penalty factor used for discretization is usually 2 or more. However, it has been proved that the penalty factor for the joint location optimization of this disclosure is preferably 4 or more.

The optimization analysis unit 23 may perform a topology optimization processing, or perform an optimization processing with another calculation method. Therefore, the optimization analysis unit 23 may, for example, use commercially available analysis software with finite elements.

<Analysis Method of Optimizing Joint Location>

An analysis method of optimizing a joint location of an automotive body (hereinafter simply referred to as 'optimization method') of the present embodiment will be described below.

Figure 8:
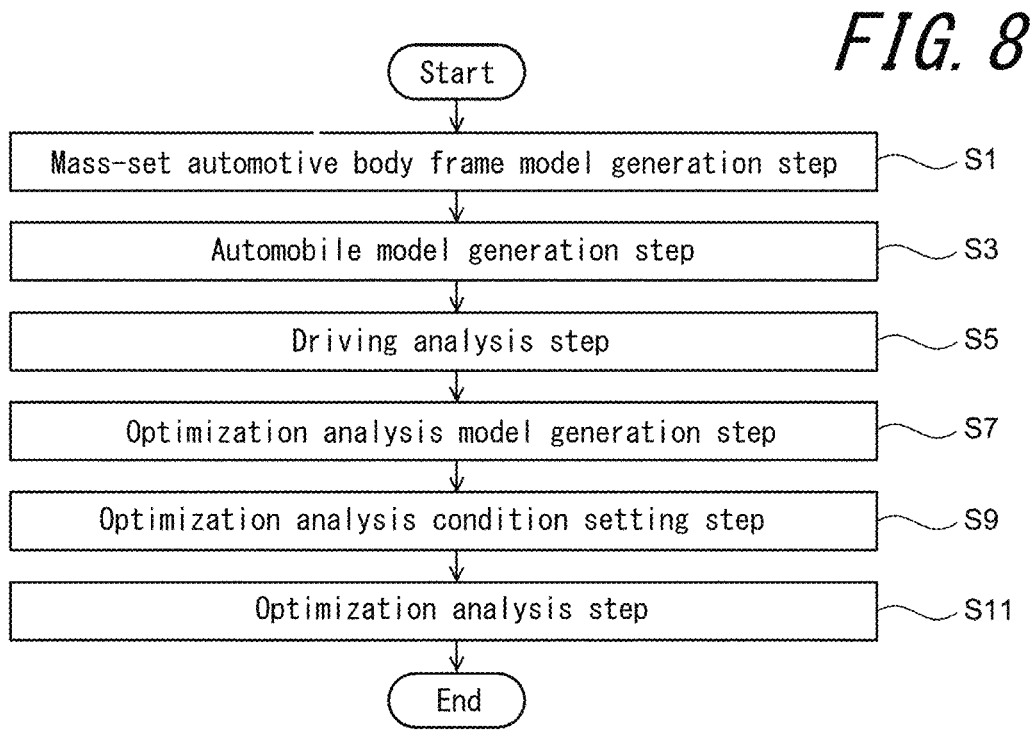
FIG. 8 is a flowchart illustrating a process flow of an analysis method of optimizing a joint location of an automotive body of an embodiment of this disclosure.

The optimization method of the present embodiment uses an automotive body frame model 31 of an automobile (see FIGS. 2A, 2B and 3), which is composed of multiple parts formed by a shell element and/or a solid element and has a welded point 33 to join the multiple parts as assemblies of parts and a fixed coupling portion 35 to fix or couple a fitting or lid component, to optimize spot welding or continuous welding used for joining the assemblies of parts. As illustrated in FIG. 8, the optimization method includes a mass-set automotive body frame model generation step S1, an automobile model generation step S3, a driving analysis step S5, an optimization analysis model generation step S7, an optimization analysis condition setting step S9 and an optimization analysis step S11.

Each step will be described below. Note that each step is executed by an optimization analysis apparatus 1 constituted by a computer.

<<Mass-Set Automotive Body Frame Model Generation Step>>

The mass-set automotive body frame model generation step S1 is a step of, as illustrated in FIG. 6, setting a mass corresponding to the mass of a fitting or lid component at a predetermined location within an area where the fitting or lid component is to be fixed or coupled to a fixed coupling portion 35 of an automotive body frame model 31, to generate a mass-set automotive body frame model 41. The mass-set automotive body frame model generation step S1 is performed by a mass-set automotive body frame model generation unit 13 in the optimization analysis apparatus 1.

Figure 9A:
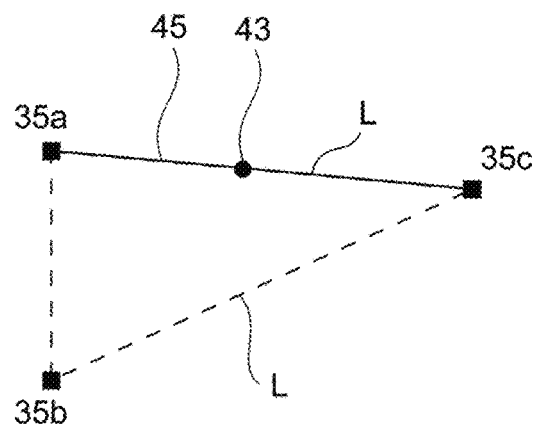
FIGS. 9A and 9B illustrate the predetermined location for setting the mass element in the mass-set automotive body frame model generation step of the present embodiment.
Figure 9B:
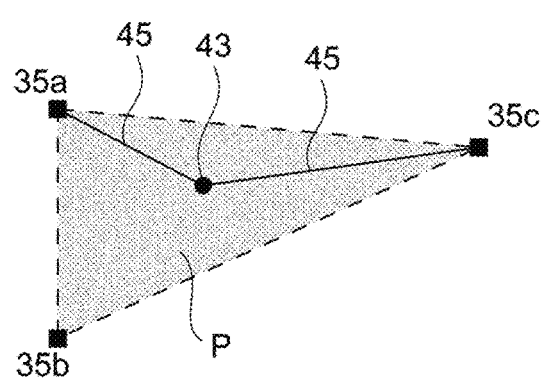

As illustrated in FIGS. 9A and 9B, the predetermined location at which a mass element 43 is to be set is on a straight line L connecting one pair (hinge 35a and door striker 35c, hinge 35b and door striker 35c, or hinge 35a and hinge 35b) of the multiple fixed coupling portions 35 (FIG. 9A), or on a curved line connecting the fixed coupling portions 35 along the shape of the automotive body to which, for example, the lid component is attached.

In the mass-set automotive body frame model 41 as illustrated in FIG. 6, the mass element 43 is set at the midpoint of the straight line L connecting the hinge 35a and the door striker 35c.

In a case where the fitting or lid component is a rotatable part that can rotate such as a revolving door, there is a rotating central axis on the line connecting the hinges 35a and 35b of the revolving door when the revolving door rotates, as in FIG. 3.

The rotating central axis is substantially at the same location as the boundary of the area where the revolving door is fixed or coupled to the automotive body frame model 31.

On the other hand, the straight line connecting the hinge 35a and the door striker 35c of the revolving door, and the straight line connecting the hinge 35b and the door striker 35c are located inside the area where the revolving door is fixed or coupled to the automotive body frame model 31.

When setting a mass corresponding to the fitting or lid component on the automotive body frame model 31, it is preferable to set it inside the boundary of the area where the fitting or lid component is fixed or coupled to the automotive body frame model 31, in consideration of the inertia force acting on the fitting or lid component in the driving analysis step S5 as described later.

Therefore, the predetermined location for setting the mass corresponding to the fitting or lid component is desirably set to be a location on the straight lines L connecting the multiple fixed coupling portions 35 or on the curved line excluding those on the rotating central axis during the rotation of the fitting or lid component.

Furthermore, the predetermined location for setting the mass corresponding to the fitting or lid component is not limited to a location on the straight lines L or on the curved line connecting the fixed coupling portions 35 along the shape of the automotive body, and may be a location in a plane P surrounded by the straight lines L (FIG. 9B) or in a curved surface surrounded by the curved line.

In this case, since the straight lines L or the curved line is the boundary of the plane P or of the curved surface, it is desirable to set the mass corresponding to the fitting or lid component inside the boundary. Therefore, it is more preferable to set the predetermined location for setting the mass corresponding to the fitting or lid component to be a location in the plane P or in the curved surface excluding those on the straight lines L or on the curved line.

In a case where the fitting is fixed or coupled by four fixed coupling portions 35, the fixed coupling portions 35 are connected by two straight lines intersect each other, and it is preferable to set the mass element 43 on the straight lines. In this case, it is also acceptable to connect the fixed coupling portions 35 by a curved line in accordance with the curvature of the automotive body and to set the mass element 43 on the curved line or in a curved surface surrounded by the curved line.

Examples of specific mass setting methods of setting the mass on the predetermined location include the following (1), (2) and (3).

(1) To set a mass element 43 having a mass corresponding to the mass of a fitting or lid component at the predetermined location, and use a rigid body element 45 to connect the mass element 43 and the fixed coupling portion 35 (see FIGS. 7A and 7B).

Figure 10:
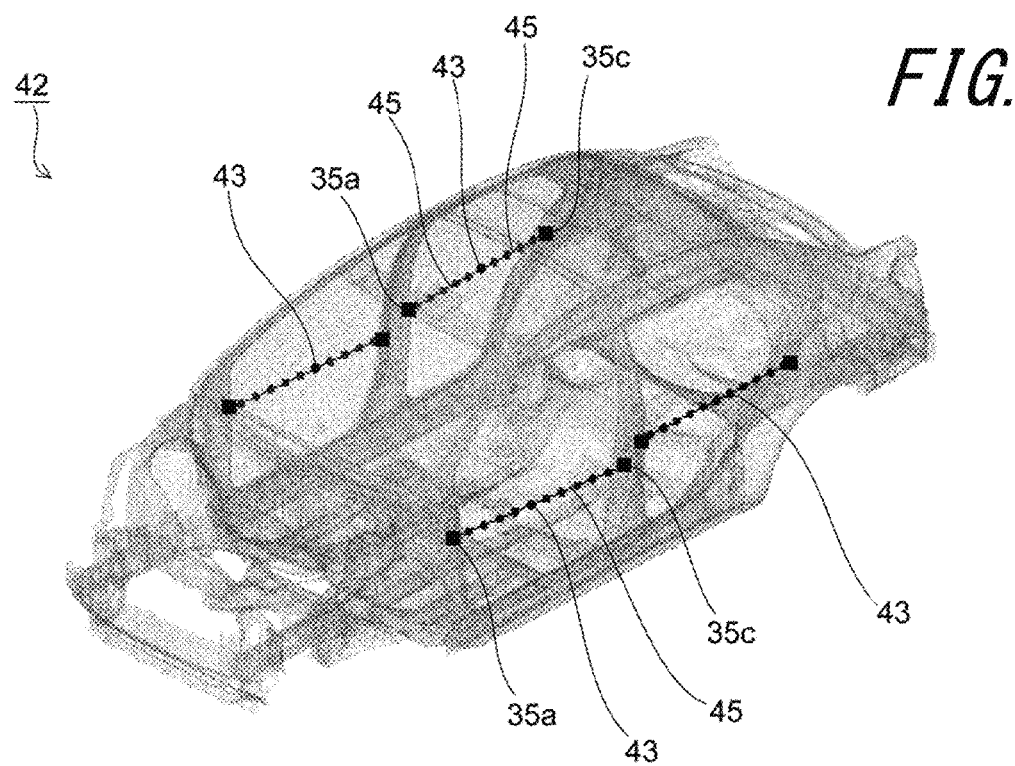
FIG. 10 illustrates another example of the mass-set automotive body frame model obtained by setting the mass element on the automotive body frame model in the mass-set automotive body frame model generation step of the present embodiment.

FIG. 6 illustrates an example in which one mass element 43 is set at the center of the straight line L connecting the fixed coupling portions 35. However, it is also acceptable to set multiple mass elements 43 on points at which the straight line L is equally divided, as illustrated in FIG. 10. In a case of setting multiple mass elements 43, the mass of each mass element 43 may be determined so that the sum of the mass of each mass element 43 corresponds to the mass of the fitting or lid component.

Figure 11A:
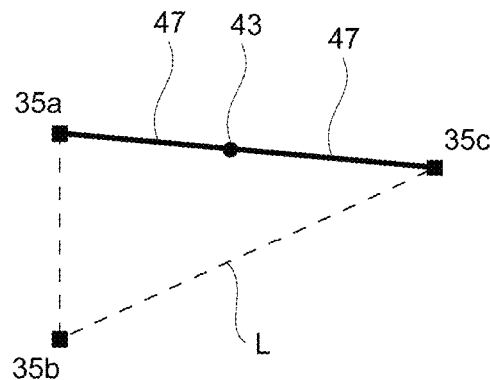
FIGS. 11A and 11B illustrate a mass setting method in the mass-set automotive body frame model generation step of the embodiment of this disclosure.

(2) To set a mass element 43 with a mass corresponding to the mass of a fitting or lid component at the predetermined location, and use a beam element 47 to connect the mass element 43 and the fixed coupling portion 35 (see FIG. 11A). The sum of the mass of each of the mass element 43 and the beam element 47 is set so as to correspond to the mass of the fitting or lid component to be fixed or coupled to the fixed coupling portion 35.

The mass of the beam element 47 is determined by the cross-sectional area given as the cross-sectional properties of the beam element 47 and the material density given as the material properties of the beam element 47. The cross-sectional area of the beam element 47 is determined, for example, by the radius of the beam element 47.

Furthermore, it is necessary to appropriately set the cross-sectional properties and the material properties of the beam element 47 as required so that the load caused by the inertia force acting on the mass element 43 and on the beam element 47 will be transmitted to the mass-set automotive body frame model 41 in the driving analysis step S5, which will be described later.

The beam element 47 is a linear element, and may be a rod element as long as it can transmit a tensile-compressive load acting in the axial direction of the element. The mass of the rod element is determined, as the case of the beam element 47, by the cross-sectional area (or radius) given as the cross-sectional properties and the material density given as the material properties.

Figure 11B:
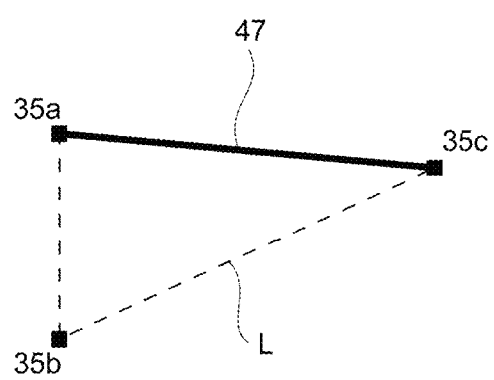

(3) To use a beam element 47 having a mass corresponding to the mass of a fitting or lid component to set (see FIG. 11B).

The mass of the beam element 47 is determined by the cross-sectional area given as the cross-sectional properties of the beam element 47 and the material density given as the material properties of the beam element 47. For example, the cross-sectional area is determined by the radius of the beam element 47.

<<Automobile Model Generation Step>>

The automobile model generation step S3 is a step of joining the mass-set automotive body frame model 41 generated in the mass-set automotive body frame model generation step S1 to a chassis model 51 having, for example, a suspension system and a steering system, to generate an automobile model 61, as illustrated in FIGS. 5A and 5B.

The joining location to the chassis model 51 on the mass-set automotive body frame model 41 is a portion (joining portion) to which a suspension or a subframe is attached. The joining portion on the mass-set automotive body frame model 41 may be the joining portion (Nodes 1 to 12 in FIG. 4) preset on the automotive body frame model 31.

<<Driving Analysis Step>>

The driving analysis step S5 is a step of using the automobile model 61 generated in the automobile model generation step S3 to perform a driving analysis of the automobile model 61 under arbitrarily set driving conditions, to acquire the performance of automotive body during driving.

Examples of the driving conditions set in the driving analysis step S5 include driving and steering of the automobile model 61.

The automobile model 61 is driven, for example, by applying a load to the automobile model 61, so that the automobile model 61 is in acceleration running or constant speed running.

Additionally, the steering of the automobile model 61 can be performed, for example, by controlling the steering angle of the steering handle provided in the chassis model 51 and via the steering system.

Figure 12A:
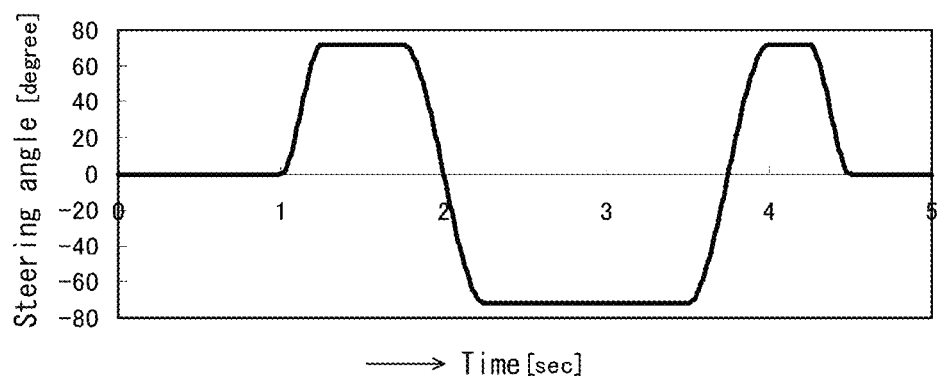
FIGS. 12A and 12B illustrate an example of driving conditions set for the driving analysis of the present embodiment, where
Figure 12B:
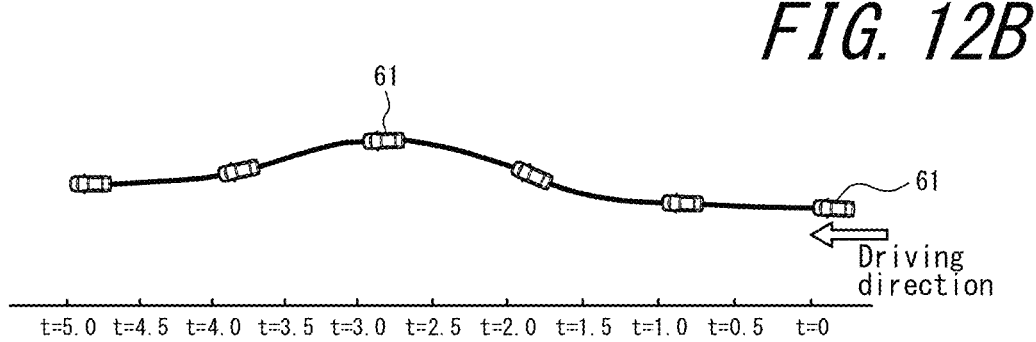

FIGS. 12A and 12B illustrate, as an example of the driving conditions in the driving analysis, the steering angle of the steering handle in a case of double lane change where lane change occurs twice continuously during driving (FIG. 12A) and the running path of the automobile model 61 corresponding to the steering angle (FIG. 12B).

In the driving analysis step S5, the load and/or displacement generated at the joining portion to the chassis model 51 on the mass-set automotive body frame model 41 is acquired as the performance of automotive body of the automobile model 61 during driving under the set driving conditions.

Furthermore, the driving analysis step S5 can also acquire the stress and deformation on the mass-set automotive body frame model 41 as the performance of automotive body of the driving automobile model 61.

For the driving automobile model 61, the load generated at the joining portion of the mass-set automotive body frame model 41 changes as the behavior of the automobile changes, and the driving analysis step S5 can appropriately acquire the load generated at the joining portion of the mass-set automotive body frame model 41 based on the behavior of the automobile in the driving analysis and the results of the load generated at each joining portion.

As described above, in the driving analysis step S5 of the present embodiment, an automobile driving analysis is performed using an automobile model 61 obtained by joining a chassis model 51 to a mass-set automotive body frame model 41 on which a mass corresponding to a fitting or lid component has been set. In this way, it is possible to acquire the performance of automotive body in consideration of the inertia force acting on the fitting or lid component during driving.

Note that the driving analysis step of the present disclosure is not limited to a driving analysis using an automobile model 61 obtained by joining a chassis model 51 to a mass-set automotive body frame model 41 on which a mass corresponding to a fitting or lid component has been set. The driving analysis may be performed using an automobile model obtained by joining an automotive body frame model 31 on which no mass is set, or an automotive body frame model on which a part model of a fitting or lid component has been set, to a chassis model, to acquire the load and displacement at the joining portion to the chassis model.

<<Optimization Analysis Model Generation Step>>

The optimization analysis model generation step S7 is a step of generating welding candidates 73 (see FIGS. 7A and 7B) to be added to the portion to join the part as an assembly of parts on the mass-set automotive body frame model 41. The optimization analysis model generation step S7 is performed by an optimization analysis model generation unit 19 in the optimization analysis apparatus 1 as illustrated in FIG. 1.

Generation of the welding candidates 73 in the optimization analysis model generating step S7 can be performed by the following procedure.

Figure 13A:
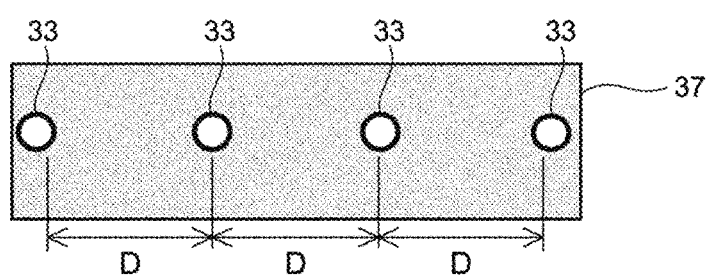
FIGS. 13A to 13C illustrate the generation of welding candidates in the optimization analysis model generation step and the selection of welding candidates in the optimizing analysis step of the present embodiment, where

As illustrated in FIG. 13A, in the mass-set automotive body frame model 41, welded points 33 are preset with a predetermined interval D at a portion to join the part 37 composing the automotive body frame model 31 as an assembly of parts.

Figure 13B:
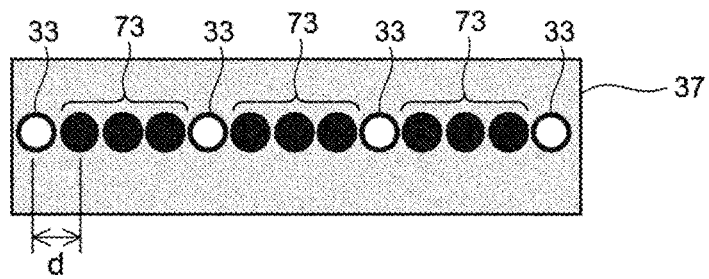

In this case, the welding candidates 73 are closely set with a predetermined interval d (<D) between the welded points 33 in the optimization analysis model generation step S7, as illustrated in FIG. 13B.

<<Optimization Analysis Condition Setting Step>>

The optimization analysis condition setting step S9 is a step of setting optimization analysis conditions for the optimization analysis on the welding candidates 73. The optimization analysis condition setting step S9 is performed by an optimization analysis condition setting unit 21 in the optimization analysis apparatus 1 based on an instruction from an operator. The optimization analysis conditions set in the optimization analysis condition setting step S9 include two kinds of conditions: objective condition and constraint condition.

<<Optimization Analysis Step>>

The optimization analysis step S11 is a step of performing an optimization analysis on the optimization analysis model generated in the optimization analysis model generation step S7 in consideration of the inertia force that acts during the automobile driving, and selecting an additional welded point or an additional welded location that satisfies the optimization analysis conditions set in the optimization analysis condition setting step S9 from the welding candidates 73. The optimization analysis step S11 is performed by an optimization analysis unit 23 in the optimization analysis apparatus 1.

Figure 13C:
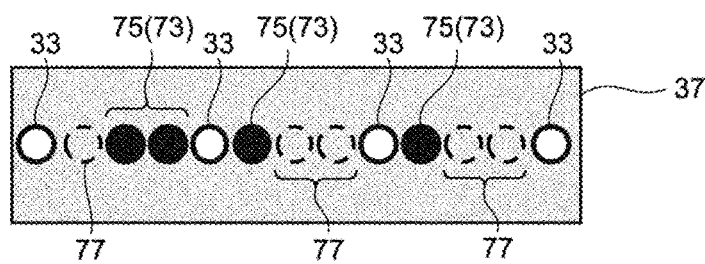

For example, for the part 37 as illustrated in FIGS. 13A to 13C, an optimization analysis is performed on the welding candidates 73 set on the part 37 in the optimization analysis step S11, so that the welding candidate 73 that satisfies the optimization analysis conditions is selected as an additional welded point 75 and the unselected welding candidate 73 is eliminated as an eliminating welded point 77, which is illustrated in FIG. 13C.

The optimization analysis step S11 of the present embodiment takes the welding candidates 73 generated between the welded points 33 preset on the automotive body frame model 31 as the optimization analysis object. In this way, it is possible to prevent the case where the welded points 33 are eliminated during the optimization analysis, the parts separate from each other, and the optimization analysis stops at that time.

The optimization analysis in the optimization analysis step S11 may apply topology optimization. Furthermore, when the topology optimization applies a density method, it is preferable to perform discretization with an element penalty factor of 4 or more.

The optimization analysis may use an inertia relief method to take the inertia force acting on a fitting or lid component during the automobile driving into consideration. The inertia relief method is an analysis method of determining stress and strain from the force acting on an object in linear motion of uniform acceleration in a state where the object is supported at a supporting point serving as a reference of coordinates of the inertia force (free supporting state). The inertia relief method is used for the static analysis of moving airplanes or moving ships.

As described above, according to the analysis method and analysis apparatus of optimizing a joint location of an automotive body of the present embodiment, it is possible to perform a driving analysis on an automobile model obtained by joining a chassis model and an automotive body frame model of an automobile having a welded point to join multiple parts as assemblies of parts, acquire a load generated at a joining portion to the chassis model on the automotive body frame model during driving by the driving analysis, and further, set welding candidates of an additional welded point or an additional welded location to be added to the assembly of parts of the automotive body frame model, perform an optimization analysis by applying the load generated at the joining portion acquired by the driving analysis to select an additional welded point from the welding candidates, and thereby determine an optimal location of an additional welded point or an additional welded location to be added to improve the stiffness of the automobile during driving with high accuracy.

Furthermore, it is possible to determine an optimal location of an additional welded point or an additional welded location to be added to improve the stiffness of the automobile during driving with higher accuracy by using a mass-set automotive body frame model obtained by setting a mass corresponding to a fitting or lid component on an automotive body frame model having a fixed coupling portion to fix or couple the fitting or lid component.

Note that, although the driving analysis and the optimization analysis as described above use a mass-set automotive body frame model 41 on which a mass has been set, the optimization analysis method and apparatus of this disclosure may perform a driving analysis and an optimization analysis using an automotive body frame model on which on mass is set (see FIGS. 2A to 4), or one on which a lid component or fitting has been set.

Furthermore, although the analysis as described above takes a welded point to join the part as an assembly of parts by spot welding as the analysis object, the analysis method and analysis apparatus of optimizing a joint location of an automotive body of this disclosure is not limited to spot welding by spot welding. The analysis method and analysis apparatus of optimizing a joint location of an automotive body of this disclosure may be applied to determine an optimal joint location when joining the assembly of parts by continuous welding such as laser welding and arc welding.

Examples

We conducted an experiment to confirm the effect of this disclosure, which will be described below.

As illustrated in FIG. 10, the experiment first took an automotive body frame model 31 as illustrated in FIGS. 2A and 2B as an object and generated a mass-set automotive body frame model 42 by setting a mass corresponding to a revolving door assembly at a predetermined location within an area where the revolving door assembly would be fixed or coupled as a lid component to the automotive body frame model 31.

The automotive body frame model 31, which was the analysis object of the present example, had welded points 33 provided at portions to join each part as an assembly of parts (see FIGS. 2A and 2B), fixed coupling portions 35 to fix or couple a fitting or lid component (see FIG. 3), and joining portions (Nodes 1 to 12 in FIG. 4) to join a chassis model 51 having, for example, a suspension system (see FIGS. 5A and 5B). The mass of the automotive body frame model 31 was about 300 kg, while the mass of the four revolving door assemblies was about 79 kg.

Then, as illustrated in FIG. 10, a mass-set automotive body frame model 42 was generated by equally arranging ten mass elements 43 on the straight line connecting the upper hinge 35a and the door striker 35c, and connecting the mass elements 43, the mass element 43 and the hinge 35a, and the mass element 43 and the door striker 35c by a rigid body element 45. The sum of the mass of each mass element 43 was set to be equal to the mass of the revolving door assembly.

Subsequently, as illustrated in FIGS. 5A and 5B, an automobile model 61 was generated by joining the mass-set automotive body frame model 42 to a chassis model 51, and a driving analysis was performed using the automobile model 61.

During the generation of the automobile model 61, the mass-set automotive body frame model 42 and the chassis model 51 were joined via the joining portions (Nodes 1 to 12 in FIG. 4) preset on the automotive body frame model 31.

The driving condition of the automobile model 61 in the driving analysis was a double lane change as illustrated in FIGS. 12A and 12B. That is to say, the automobile model 61 was applies with a load and accelerated to 50 km/h during the time period from the start of driving to 1.0 s, then the automobile model 61 was driven at a constant speed without acceleration and the steering angle, which would lead to the lane change, changed as illustrated in FIG. 12A, the handle started to turn at the time point of 1.0 s to change the lane, and the simulation continued until the automobile model 61 returned to the original lane at the time point of 5.0 s.

The load generated at the joining portion (Nodes 1 to 12) between the mass-set automotive body frame model 42 and the chassis model 51 during the automobile model 61 driving was acquired by the driving analysis under the driving condition as described above.

FIGS. 14A to 14E illustrate the results of the load generated at the joining portions (Nodes 1, 2, and 7 to 10) on the front side of the automobile acquired by the driving analysis.

Figure 14A:
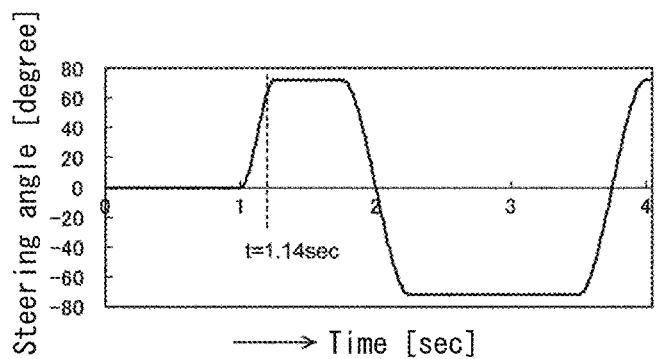
FIGS. 14A to 14E illustrate the driving conditions for a driving analysis and the results of a load generated at a joining portion on the front side of a mass-set automotive body frame model acquired by the driving analysis in EXAMPLES, where
Figure 14B:
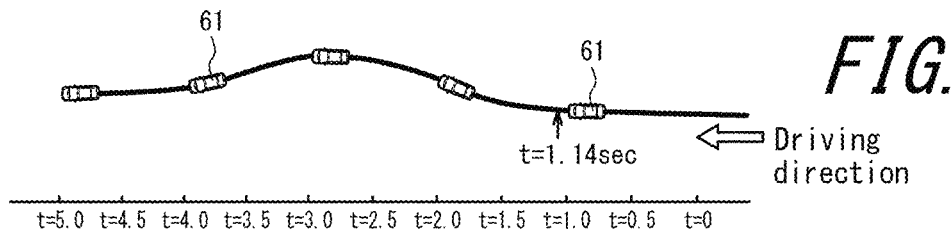
Figure 14C:
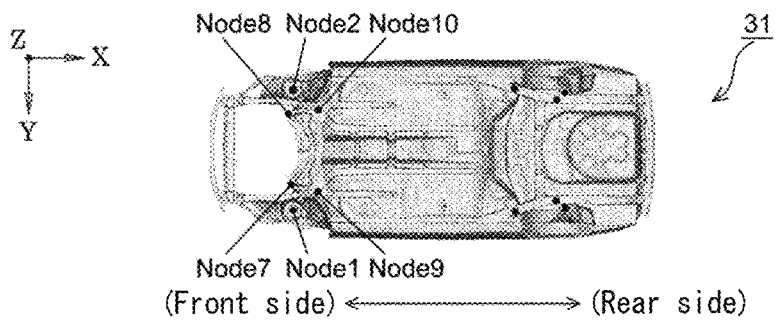
Figure 14D:
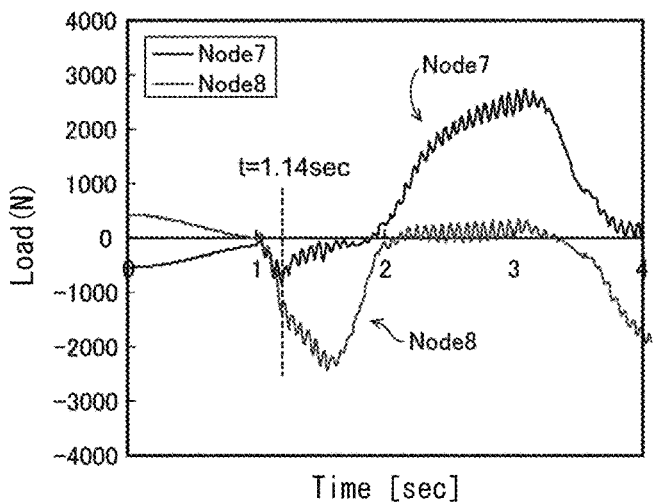
Figure 14E:
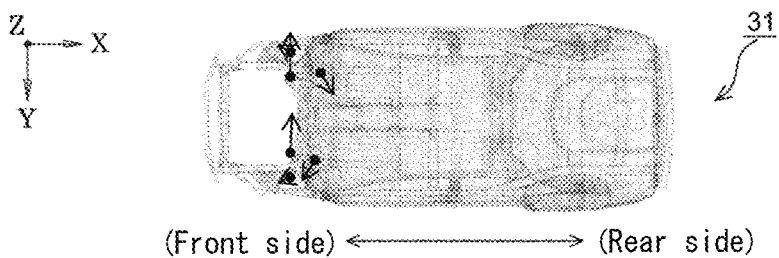

In FIGS. 14A to 14E, FIG. 14A illustrates the steering angle in the driving analysis, FIG. 14B illustrates the running path of the automobile model 61, FIG. 14C illustrates the location of the front-side joining portion (Nodes 1, 2, and 7 to 10) for acquiring the load, FIG. 14D illustrates the change with time of the load in Y direction (automobile width direction) generated at Nodes 7 and 8 of the joining portions, and FIG. 14E illustrates the direction and magnitude of the load generated at each joining portion when t=1.14 sec elapsed from the start of driving.

FIGS. 15A to 15E illustrate the load generated at the joining portion (Nodes 3 to 6, 11, and 12) in the rear side of the automobile acquired by the driving analysis.

Figure 15A:
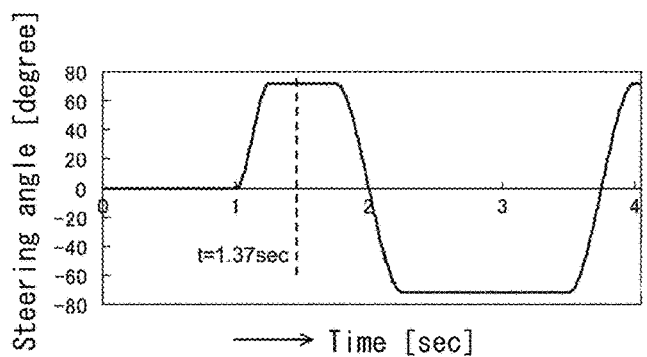
FIGS. 15A to 15E illustrate the driving conditions for a driving analysis and the results of a load generated at a joining portion on the rear side of a mass-set automotive body frame model acquired by the driving analysis in EXAMPLES, where
Figure 15B:
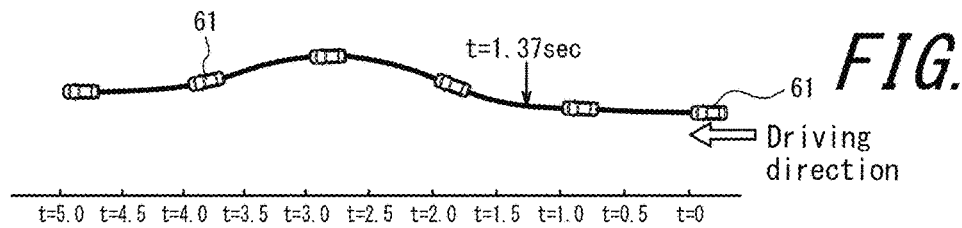
Figure 15C:
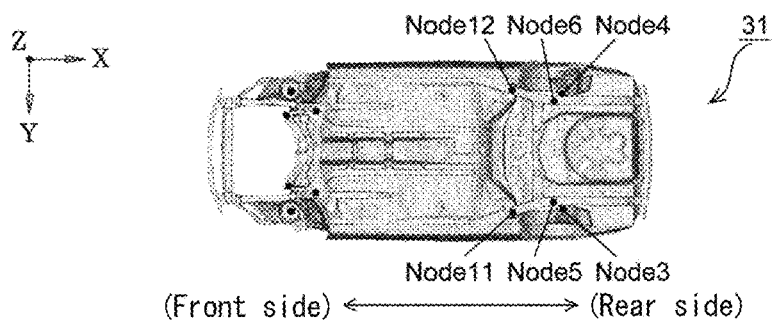
Figure 15D:
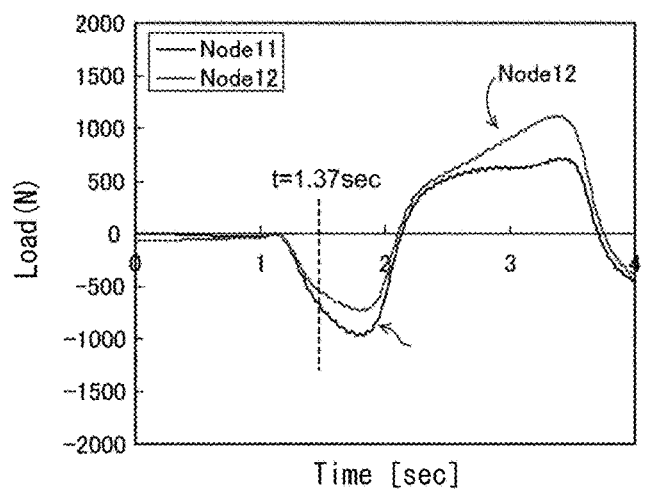
Figure 15E:
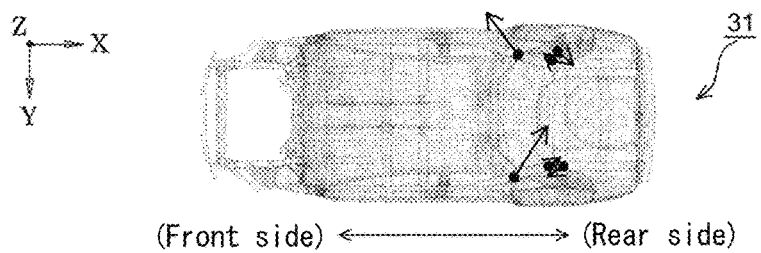

In FIGS. 15A to 15E, FIG. 15A illustrates the steering angle in the driving analysis, FIG. 15B illustrates the running path of the automobile model 61, FIG. 15C illustrates the location of the rear-side joining portion (Nodes 3 to 6, 11, and 12) for acquiring the load, FIG. 15D illustrates the change with time of the load in Y direction (automobile width direction) generated at Nodes 11 and 12 of the joining portions, and FIG. 15E illustrates the direction and magnitude of the load generated at each joining portion when t=1.37 sec elapsed from the start of driving.

It can be understood from FIGS. 14A to 15E that the load generated at each joining portion is different from each other (FIG. 14D and FIG. 15D) and that the magnitude and direction of the load are different on each location of the joining portion (FIG. 14E and FIG. 15E).

Note that for the front-side joining portions (Nodes 1, 2, and 7 to 10), the load when t=1.14 sec elapsed from the start of driving (FIGS. 14A to 14E) was determined as the load generated at the joining portion during driving, and for the rear-side joining portions (Nodes 3 to 6, 11, and 12), the load when t=1.37 sec elapsed from the start of driving (FIGS. 15A to 15E) was determined as the load generated at the joining portion during driving respectively in the present example.

The elapsed time to determine the load as described above was set to be immediately after starting to turn the handle during the driving analysis, and the time for the rear side was slightly delayed compared with the time for the front side. However, the time to determine the load can be appropriately selected based on the behavior of the automobile in the driving analysis and the results of the load generated at each joining portion.

In the present example, an automotive body frame model 31 (FIG. 16A) on which the mass of the revolving door assembly was not set, and an automotive body frame model 81 (FIG. 16B) obtained by setting a revolving door assembly model 83 on the automotive body frame model 31 were also joined to a chassis model in the same way as the mass-set automotive body frame model 42 to generate an automobile model respectively, and a driving analysis was performed to acquire the load generated at the joining portion to the chassis model.

FIGS. 17A and 17B illustrate the magnitude and direction (FIG. 14E) of the load generated at the front-side joining portion (Nodes 1, 2, and 7 to 10) on the mass-set automotive body frame model 42 acquired by the driving analysis. The value of the load at each joining portion is as illustrated in FIG. 17B.

FIGS. 18A and 18B illustrate the magnitude and direction (FIG. 15E) of the load generated at the rear-side joining portion (Nodes 3 to 6, 11, and 12) of the mass-set automotive body frame model 42 acquired by the driving analysis. The magnitude of the load at each joining portion is as illustrated in FIG. 18B.

In a comparative example, without performing the driving analysis, a provisional load assuming the case of a lane change was applied to the joining portion on the mass-set automotive body frame model 42 to perform an optimization analysis of a joint location, and the difference in the loading condition of the optimization analysis was investigated.

FIGS. 17C and 17D illustrate the magnitude and direction of the provisional load applied to the front-side joining portion (Nodes 1, 2, and 7 to 10) of the mass-set automotive body frame model 42, where a uniform load (=1000 N) was applied to each joining portion in the same direction (Y direction).

FIGS. 18C and 18D illustrate the magnitude and direction of the provisional load applied to the rear-side joining portion (Nodes 3 to 6, 11, and 12) of the mass-set automotive body frame model 42, where a uniform load (=1000 N) was applied to each joining portion in the same direction (Y direction).

As in the case of the driving analysis, an optimization analysis of a joint location was also performed on each of an optimization analysis model obtained by setting welding candidates on the automotive body frame model 31 (FIG. 16A) where the mass corresponding to the revolving door assembly was not set, and an optimization analysis model obtained by setting welding candidates on the automotive body frame model 81 (FIG. 16B) where the revolving door assembly model 83 had been set.

When optimizing an additional welded point in the optimization analysis, if the objective condition is set to be stiffness maximization, then the stiffness of the automotive body frame model is evaluated by applying a loading and constraint condition to the joining portion on the optimization analysis model. It had been proved in the driving analysis as described above that the magnitude and direction of the load generated during the automobile driving were different at each joining portion. Therefore, in this case, we performed a stiffness analysis on the automotive body frame model by applying a loading condition to the joining portion of the automotive body frame model, and investigated the deformation of the automobile caused by the difference in the loading condition applied to the joining portion of the automotive body frame model.

FIGS. 19A to 20D illustrate the analysis results of the deformation of automotive body of the stiffness analysis performed by applying the load acquired by the driving analysis to the front-side joining portion as a loading condition.

In FIGS. 19A to 20D, FIGS. 19A to 19C and FIGS. 20A to 20C illustrate the analysis results of the automotive body displacement amount, where FIGS. 19A and 20A illustrate the mass-set automotive body frame model 42 on which the mass of the revolving door assembly is set (with mass setting), FIGS. 19B and 20B illustrate the automotive body frame model 31 on which the mass of the revolving door assembly is not set (without mass setting), and FIGS. 19C and 20C illustrate the automotive body frame model 81 on which the revolving door assembly model 83 is set (with door setting), and FIGS. 19D and 20D illustrate the magnitude and direction of the load at the rear-side joining portion acquired by the driving analysis. FIGS. 19A to 19D illustrate the automotive body from the front left side, and FIGS. 20A to 20D illustrate the automotive body from the rear left side. In FIGS. 19A to 20D, the displacement amount of the automotive body is indicated at 1000 times.

It was found that the automotive body displacement on the automotive body frame model 31 without mass setting was somewhat different from the mass-set automotive body frame model 42 and from the automotive body frame model 81 where the revolving door assembly model 83 had been set, in the portion where the automotive body displacement was large (such as the roof part). However, these models tended to have similar displacement on the entire automotive body.

FIGS. 21A to 22D illustrate the analysis results of the deformation of automotive body of the stiffness analysis performed by applying a provisional loading condition assuming the case of a lane change to the rear-side joining portion.

In FIGS. 21A to 22D, FIGS. 21A to 21C and FIGS. 22A to 22C illustrate the analysis results of the automotive body displacement amount, where FIGS. 21A and 22A illustrate the result of the mass-set automotive body frame model 42 on which the mass of the revolving door assembly is set (with mass setting), FIGS. 21B and 22B illustrate the result of the automotive body frame model 31 on which the mass of the revolving door assembly is not set (without mass setting), and FIGS. 21C and 22C illustrate the result of the automotive body frame model 81 on which the revolving door assembly model 83 is set (with door setting), respectively, and FIGS. 21D and 22D illustrate the magnitude and direction of the provisional load applied to the rear-side joining portion, which are similar to FIGS. 19A to 20D. FIGS. 21A to 21D illustrate the automotive body from the front left side, and FIGS. 22A to 22D illustrate the automotive body from the rear left side. In FIGS. 21A to 22D, the displacement amount of the automotive body is indicated at 1000 times.

It was also found that, even in the case of inputting a provisional load, the automotive body displacement on the automotive body frame model 31 without mass setting was somewhat different from the mass-set automotive body frame model 42 and from the automotive body frame model 81 where a revolving door assembly model 83 had been set, in the portion where the automotive body displacement was large (such as the roof part). However, these models tended to have similar displacement on the entire automotive body.

On the other hand, the overall value of the automotive body displacement in the case of using a provisional load (FIGS. 21A to 22D) is larger than that of the case of using the load acquired by the driving analysis (FIGS. 19A to 20D) (see the value of 'total displacement' in the figures), and it was found that the difference in the loading condition greatly influences the automotive body displacement.

As described above, we compared the case of applying the load acquired by the driving analysis and the case of inputting a provisional load, and found that the deformation behavior is quite different in all automotive body frame models. Therefore, it is desirable to apply the load acquired by the driving analysis in the analysis of optimizing an additional welded point to be added to the automotive body.

Next, the results of the optimization analysis on welding candidates to determine an additional welded point will be described (FIGS. 23A to 26).

When performing the optimization analysis, an optimization analysis model 71 (FIGS. 7A and 7B) was firstly generated by closely setting welding candidates 73 (see FIGS. 13A to 13C) between the welded points 33 preset on the mass-set automotive body frame model 42 used in the driving analysis.

The interval between the welding candidates 73 was d=10 mm. There were 3906 welded points 33 on the mass-set automotive body frame model 42, and 10932 welding candidates 73 set to be the object of the optimization analysis.

Subsequently, optimization analysis conditions were set for the optimization analysis model 71.

As the optimization analysis conditions of the present example, the objective condition was to maximize the automotive body stiffness, and the constraint condition was to set a volume ratio so that 600 additional welded points 75 to be added could be selected (FIGS. 13A to 13C).

Then, an optimization analysis was performed by applying the load generated at the joining portion (Nodes 1 to 12 in FIG. 4) of the mass-set automotive body frame model 42 acquired by the driving analysis as a loading and constraint condition, to select the additional welded point 75 that satisfied the optimization analysis conditions as described above.

FIGS. 23A to 23F illustrate the results of additional welded points 95 optimized by an optimization analysis on an optimization analysis model 91 obtained by setting the welding candidates 73 on the automotive body frame model 31.

Figure 23A:
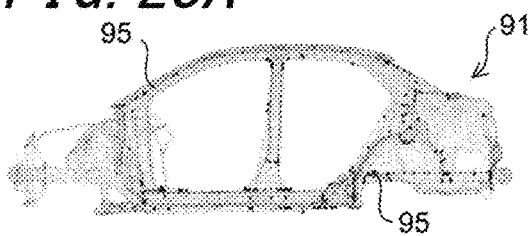
FIGS. 23A to 23F illustrate the analysis results of the additional welded point selected by an optimization analysis on an optimization analysis model generated by using a mass-set automotive body frame model in EXAMPLES.
Figure 23B:
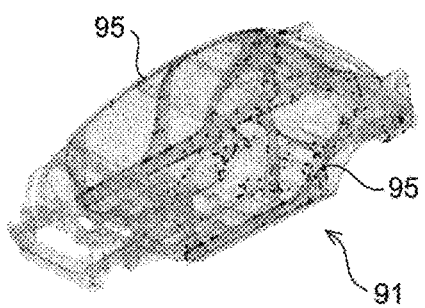
Figure 23C:

FIGS. 23A and 23B illustrate additional welded points 95 optimized by an optimization analysis performed by applying the load (FIG. 23C) acquired by the driving analysis which used the automotive body frame model 31 without mass setting to the optimization analysis model 91, which are within the scope of this disclosure (Example 1).

Figure 23D:
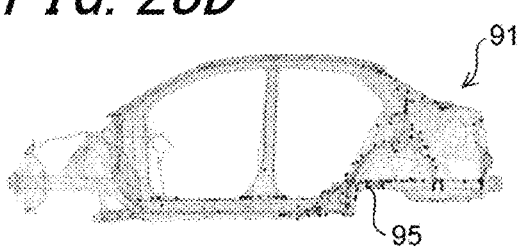
Figure 23E:
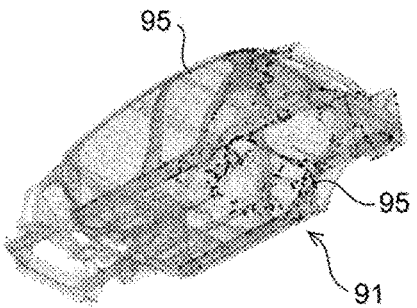
Figure 23F:

FIGS. 23D and 23E illustrate additional welded points 95 optimized by an optimization analysis performed by applying a provisional load (FIG. 23F) without driving analysis to the optimization analysis model 91, which are outside the scope of this disclosure (Comparative Example 1).

FIGS. 24A to 24F illustrates the results of additional welded points 75 optimized by an optimization analysis on the optimization analysis model 71 obtained by setting the welding candidates 73 on the mass-set automotive body frame model 42.

FIGS. 24A and 24B illustrate additional welded points 75 optimized by an optimization analysis performed by applying the load (FIG. 24C) acquired by the driving analysis which used the mass-set automotive body frame model 42 to the optimization analysis model 71, which are within the scope of this disclosure (Example 2).

FIGS. 24D and 24E illustrate additional welded points 75 optimized by an optimization analysis performed by applying a provisional load (FIG. 24F) without driving analysis to an optimization analysis model 101, which are outside the scope of this disclosure (Comparative Example 2).

FIGS. 25A to 25F illustrates the results of additional welded points 105 optimized by an optimization analysis on an optimization analysis model 101 obtained by setting the revolving door assembly model 83 and the welding candidates 73 on the automotive body frame model 31.

FIGS. 25A and 25B illustrate additional welded points 105 optimized by an optimization analysis performed by applying the load (FIG. 25C) acquired by the driving analysis which used the automotive body frame model 81 to the optimization analysis model 101, which are within the scope of this disclosure (Example 3).

FIGS. 25D and 25E illustrate additional welded points 105 optimized by an optimization analysis performed by applying a provisional load (FIG. 25F) without driving analysis to the optimization analysis model 101, which are outside the scope of this disclosure (Comparative Example 3).

When comparing the Examples (Examples 1 to 3) in which the optimization analysis was performed by applying the load acquired by the driving analysis, no great difference was found in the locations of the additional welded points 75, 95 and 105.

Furthermore, when comparing the Comparative Examples (Comparative Examples 1 to 3), in which the optimization analysis was performed by applying a provisional load, and the Examples (Examples 1 to 3), differences were found in the locations of the additional welded points 75, 95, and 105 at the door opening portion and the front portion of the automotive body.

Figure 26:
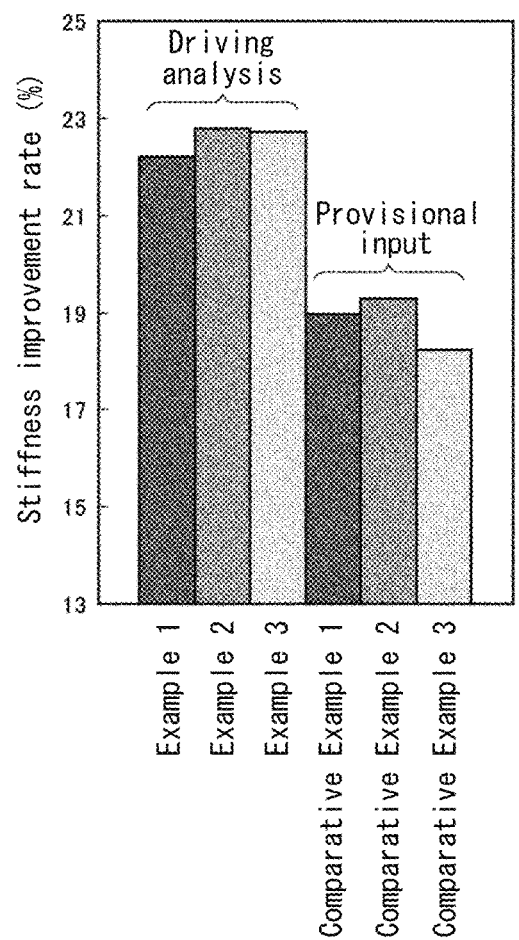
FIG. 26 illustrates the results of the stiffness improvement rate of an automotive body whose additional welded point has been optimized by the optimization analysis in EXAMPLES.

FIG. 26 illustrates the results of the stiffness improvement rate of the automotive body to which the additional welded points were added by the optimization analysis of the Examples 1 to 3 and Comparative Examples 1 to 3 as described above.

The stiffness of the automotive body is the average value of the values obtained by dividing the load by the displacement at the joining portion to which the load is applied, and the stiffness improvement rate is a relative change of the average stiffness determined based on the automotive body frame model 31 before performing the optimization analysis.

Both the Examples and the Comparative Examples obtained a positive (+) value of stiffness improvement rate and an improved automotive body stiffness by setting the additional welded points optimized by the optimization analysis.

Additionally, the Examples 1 to 3, in which the optimization analysis was performed by applying the load acquired by the driving analysis, obtained a high stiffness improvement rate as compared with the Comparative Examples 1 to 3, in which the optimization analysis was performed by applying a provisional load.

Furthermore, when comparing the Examples 1 to 3 with each other, it was found that the Example 2, in which a mass corresponding to a revolving door assembly was set, and the Example 3, in which a revolving door assembly was set as it was, had almost the same stiffness improvement rate, and the Example 1, in which a mass corresponding to a revolving door assembly was not set, had a slightly smaller stiffness improvement rate than that of the Examples 2 and 3. Therefore, it was proved that, by setting a mass corresponding to a revolving door assembly on the automotive body frame model, the inertia force acting on the lid component during driving could be taken into consideration and the additional welded point could be optimized with higher accuracy.

As described above, it has been proved that, according to the analysis method and analysis apparatus of optimizing a joint location of an automotive body of this disclosure, it is possible to use an automotive body frame model of an automobile having a welded point to join multiple parts as assemblies of parts, perform a driving analysis on an automobile model obtained by joining the automotive body frame model to a chassis model, acquire a load generated at a joining portion with the chassis model on the automotive body frame model during driving by the driving analysis, and further, set welding candidates of an additional welded point or an additional welded location to be added to the assembly of parts of the automotive body frame model, perform an optimization analysis by applying the load generated at the joining portion acquired by the driving analysis to select an additional welded point from the welding candidates, and thereby determine an optimal location of an additional welded point to be added to improve the stiffness of the automobile during driving with high accuracy.

Furthermore, it has been proved that, by using a mass-set automotive body frame model obtained by setting a mass corresponding a fitting or lid component on an automotive body frame model having a fixed coupling portion to fix or couple the fitting or lid component, it is possible to determine an optimal location of an additional welded point to be added to improve the stiffness of the automobile during driving with higher accuracy.

REFERENCE SIGNS LIST

1 optimization analysis apparatus
3 display device
5 input device
7 memory storage
9 working data memory
11 arithmetic processing unit
13 mass-set automotive body frame model generation unit
15 automobile model generation unit
17 driving analysis unit
19 optimization analysis model generation unit
21 optimization analysis condition setting unit
23 optimization analysis unit
30 automotive body frame model file
31 automotive body frame model
33 welded point
35 fixed coupling portion
35a hinge (upper side)
35b hinge (lower side)
35c door striker
37 part
41 mass-set automotive body frame model
43 mass element
45 rigid body element
47 beam element
51 chassis model
61 automobile model
71 optimization analysis model
73 welding candidate
75 additional welded point (after optimization analysis)
77 eliminating welded point (after optimization analysis)
81 automotive body frame model (with revolving door assembly model setting)
83 revolving door assembly model
91 optimization analysis model (without mass setting)
95 additional welded point (without mass setting)
101 optimization analysis model (with door setting)
105 additional welded point (with door setting)

The invention claimed is:

1. An analysis method of optimizing a joint location of an automotive body, using an automotive body frame model comprising multiple parts formed by at least one of a shell element or a solid element and a welded point or a welded location to join the multiple parts as assemblies of parts, wherein the analysis method performs an optimization analysis of spot welding or continuous welding used for joining the assemblies of parts by a computer in the following steps, comprising:

an automobile model generation step where the computer generates an automobile model by joining the automotive body frame model to a chassis model;

a driving analysis step where the computer performs a driving analysis of the automobile model to acquire at least one of a load or displacement generated at a joining portion to the chassis model on the automotive body frame model during driving;

an optimization analysis model generation step where the computer sets welding candidates of an additional welded point or an additional welded location to be added and joined to the assembly of parts on the automotive body frame model, to generate an optimization analysis model as an optimization analysis object;

an optimization analysis condition setting step where the computer sets optimization analysis conditions for the optimization analysis model based on an instruction from an operator; and an optimization analysis step where the computer performs an optimization analysis by applying at least one of the load or the displacement generated at the joining portion acquired in the driving analysis step to the optimization analysis model, to select an additional welded point or an additional welded location that satisfies the optimization analysis conditions from the welding candidates, wherein in the optimization analysis model generation step, the welding candidates are set at a predetermined interval between welded points or welded locations preset on each assembly of parts of the automotive body frame model.

2. The analysis method of optimizing a joint location of an automotive body according to claim 1, comprising a mass-set automotive body frame model generation step wherein a mass corresponding to the mass of a fitting or lid component is set at a predetermined location within an area where the fitting or lid component is to be fixed or coupled to the automotive body frame model.

3. An analysis apparatus of optimizing a joint location of an automotive body, using an automotive body frame model comprising multiple parts formed by at least one of a shell element or a solid element and a welded point or a welded location to join the multiple parts as assemblies of parts, to perform an optimization analysis of spot welding or continuous welding used for joining the assemblies of parts, comprising:

an automobile model generation unit that generates an automobile model by joining the automotive body frame model to a chassis model;

a driving analysis unit that performs a driving analysis of the automobile model to acquire at least one of a load or displacement generated at a joining portion to the chassis model on the automotive body frame model during driving;

an optimization analysis model generation unit that sets welding candidates of an additional welded point or an additional welded location to be added and joined to the assembly of parts on the automotive body frame model, to generate an optimization analysis model as an optimization analysis object;

an optimization analysis condition setting unit that sets optimization analysis conditions for the optimization analysis model; and an optimization analysis unit that performs an optimization analysis by applying at least one of the load or the displacement generated at the joining portion acquired by the driving analysis unit to the optimization analysis model, to select an additional welded point or an additional welded location that satisfies the optimization analysis conditions from the welding candidates, wherein the optimization analysis model generation unit sets the welding candidates at a predetermined interval between welded points or welded locations preset on each assembly of parts of the automotive body frame model.

4. The analysis apparatus of optimizing a joint location of an automotive body according to claim 3, comprising a mass-set automotive body frame model generation unit that sets a mass corresponding to the mass of a fitting or lid component at a predetermined location within an area where the fitting or lid component is to be fixed or coupled to the automotive body frame model.

* * * * *